US012295892B2

(12) United States Patent
Klem et al.

(10) Patent No.: US 12,295,892 B2
(45) **Date of Patent: *May 13, 2025**

(54) SUPPORT FOR SECURING A ROBOTIC SYSTEM TO A PATIENT TABLE

(71) Applicant: Corindus, Inc., Newton, MA (US)

(72) Inventors: Eric Klem, Lexington, MA (US); Natalie Ferrari, Waltham, MA (US); Kyle McKenney, Westwood, MA (US)

(73) Assignee: Siemens Healthineers Endovascular Robotics, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,439

(22) Filed: Nov. 3, 2023

(65) Prior Publication Data

US 2024/0074931 A1 Mar. 7, 2024

Related U.S. Application Data

(63) Continuation of application No. 17/813,154, filed on Jul. 18, 2022, now Pat. No. 11,844,732.

(60) Provisional application No. 63/203,794, filed on Jul. 30, 2021.

(51) Int. Cl.

| | |
|---|---|
| ***A61G 13/08*** | (2006.01) |
| ***A47C 21/00*** | (2006.01) |
| ***A61G 7/015*** | (2006.01) |
| ***A61G 7/05*** | (2006.01) |

(52) U.S. Cl.

CPC .............. *A61G 13/08* (2013.01); *A47C 21/00* (2013.01); *A61G 7/015* (2013.01); *A61G 7/05* (2013.01)

(58) Field of Classification Search

CPC ...... A61G 13/08; A61G 7/015; A61G 7/0503; A61G 7/05; A47C 21/00; A47C 19/22; A47C 31/00

USPC ................. 5/616, 613, 600, 601, 503.1, 658

See application file for complete search history.

(56) References Cited

U.S. PATENT DOCUMENTS

| | | | |
|---|---|---|---|
| 1,797,847 | A | 3/1931 | Vandagriff |
| 1,862,237 | A | 6/1932 | Pepler |
| 3,821,525 | A | 6/1974 | Eaton et al. |
| 3,823,709 | A | 7/1974 | McGuire |
| 4,583,725 | A | 4/1986 | Arnold |
| 4,616,813 | A | 10/1986 | McConnell |
| 4,702,465 | A | 10/1987 | McConnell |
| 4,840,363 | A | 6/1989 | McConnell |
| 4,901,964 | A | 2/1990 | McConnell |
| 5,287,575 | A | 2/1994 | Allen et al. |
| 5,312,338 | A | 5/1994 | Nelson et al. |
| 5,350,101 | A | 9/1994 | Godlewski |
| 6,385,802 | B1 | 5/2002 | Roberts |

(Continued)

FOREIGN PATENT DOCUMENTS

| | | |
|---|---|---|
| CN | 115670663 | 2/2023 |
| CN | 115670664 | 2/2023 |

(Continued)

*Primary Examiner* — Robert G Santos

(57) ABSTRACT

A support attaches a mechanism to a patient table having a patient supporting surface and a first rail and a second rail. The support comprising: a base; a first engagement member; a second engagement member; and a single engagement mechanism moving the first engagement member and the second engagement member from a loading position to a secured position securing the base to the first rail and the second rail.

20 Claims, 15 Drawing Sheets

(56) References Cited

U.S. PATENT DOCUMENTS

| | | | |
|---|---|---|---|
| 6,478,028 B1 | 11/2002 | Paolitto et al. | |
| 6,558,371 B2 | 5/2003 | Dorn | |
| 7,331,967 B2 | 2/2008 | Lee et al. | |
| 7,766,856 B2 | 8/2010 | Ferry et al. | |
| 7,766,894 B2 | 8/2010 | Weitzner et al. | |
| 7,789,874 B2 | 9/2010 | Yu et al. | |
| 7,822,466 B2 | 10/2010 | Stoianovici et al. | |
| 7,972,298 B2 | 7/2011 | Wallace et al. | |
| 8,052,636 B2 | 11/2011 | Moll et al. | |
| 8,092,397 B2 | 1/2012 | Wallace et al. | |
| 8,146,599 B2 | 4/2012 | Wilson et al. | |
| 8,146,874 B2 | 4/2012 | Yu | |
| 8,343,096 B2 | 1/2013 | Kirschenman et al. | |
| 8,449,449 B2 | 5/2013 | Haarstad et al. | |
| 8,617,102 B2 | 12/2013 | Moll et al. | |
| 8,684,952 B2 | 4/2014 | Weitzner et al. | |
| 8,708,952 B2 | 4/2014 | Cohen et al. | |
| 8,736,212 B2 | 5/2014 | Sandhu et al. | |
| 8,747,309 B2 | 6/2014 | Viola | |
| 8,801,661 B2 | 8/2014 | Moll et al. | |
| 8,974,408 B2 | 3/2015 | Wallace et al. | |
| 8,986,246 B2 | 3/2015 | Foley et al. | |
| 9,283,046 B2 | 3/2016 | Walker et al. | |
| 9,326,822 B2 | 5/2016 | Lewis et al. | |
| 9,408,669 B2 | 8/2016 | Kokish et al. | |
| 9,566,201 B2 | 2/2017 | Yu | |
| 9,782,564 B2 | 10/2017 | Zirps et al. | |
| 9,814,864 B2 | 11/2017 | Scarpine et al. | |
| 9,820,819 B2 | 11/2017 | Olson | |
| 9,825,455 B2 | 11/2017 | Sandhu et al. | |
| 9,974,619 B2 | 5/2018 | Goldenberg et al. | |
| 10,159,533 B2 | 12/2018 | Moll et al. | |
| 10,213,264 B2 | 2/2019 | Tanner et al. | |
| 10,307,214 B2 | 6/2019 | Lathrop et al. | |
| 10,376,672 B2 | 8/2019 | Yu | |
| 10,448,859 B2 | 10/2019 | Wehner et al. | |
| 10,449,007 B2 | 10/2019 | Deboeuf et al. | |
| 10,667,875 B2 | 6/2020 | DeFonzo et al. | |
| 10,702,348 B2 | 7/2020 | Moll et al. | |
| 11,013,574 B1 | 5/2021 | Gomez et al. | |
| 11,844,732 B2 * | 12/2023 | Klem | A61G 7/05 |
| 2002/0177789 A1 | 11/2002 | Ferry et al. | |
| 2004/0254566 A1 | 12/2004 | Plicchi et al. | |
| 2006/0248650 A1 | 11/2006 | Skripps | |
| 2007/0060879 A1 | 3/2007 | Weitzner et al. | |
| 2008/0214592 A1 | 9/2008 | Wilson et al. | |
| 2008/0243064 A1 | 10/2008 | Stahler et al. | |
| 2008/0245946 A1 | 10/2008 | Yu | |
| 2009/0082722 A1 | 3/2009 | Munger et al. | |
| 2009/0308400 A1 | 12/2009 | Wilson | |
| 2012/0071752 A1 | 3/2012 | Sewell et al. | |
| 2013/0269109 A1 * | 10/2013 | Yu | A61G 7/0503 5/503.1 |
| 2014/0276389 A1 | 9/2014 | Walker | |
| 2015/0142013 A1 | 5/2015 | Tanner et al. | |
| 2015/0366433 A1 | 12/2015 | Atarot et al. | |
| 2017/0007343 A1 | 1/2017 | Yu | |
| 2017/0304021 A1 | 10/2017 | Hathaway | |
| 2017/0348060 A1 | 12/2017 | Blacker | |
| 2018/0132951 A1 | 5/2018 | Olson | |
| 2018/0207794 A1 | 7/2018 | Sebring et al. | |
| 2019/0175887 A1 | 6/2019 | Shameli | |
| 2020/0008997 A1 | 1/2020 | Dalbert | |
| 2020/0069333 A1 | 3/2020 | Ahluwalia et al. | |
| 2020/0085342 A1 | 3/2020 | Wehner et al. | |
| 2020/0085516 A1 | 3/2020 | DeFonzo et al. | |
| 2020/0163733 A1 | 5/2020 | Smith et al. | |
| 2020/0188043 A1 | 6/2020 | Yu et al. | |
| 2020/0323596 A1 | 10/2020 | Moll et al. | |
| 2021/0093407 A1 | 4/2021 | Frederiskson et al. | |
| 2023/0035163 A1 | 2/2023 | Klem | |
| 2024/0074931 A1 * | 3/2024 | Klem | A61G 7/05 |

FOREIGN PATENT DOCUMENTS

| | | |
|---|---|---|
| EP | 1560527 | 10/2008 |
| EP | 2124800 | 12/2009 |
| EP | 1980212 | 5/2011 |
| EP | 2893898 | 3/2017 |
| EP | 3072472 | 8/2017 |
| EP | 4124328 | 2/2023 |
| WO | 0143592 | 6/2001 |
| WO | 2018147930 | 8/2018 |
| WO | 2019227129 | 12/2019 |
| WO | 2020002749 | 1/2020 |
| WO | 2020020432 | 1/2020 |
| WO | 2021003275 | 1/2021 |
| WO | 2021011518 | 1/2021 |
| WO | 2021011533 | 1/2021 |
| WO | 2021011551 | 1/2021 |
| WO | 2021011554 | 1/2021 |
| WO | 2021094671 | 5/2021 |
| WO | 2021094673 | 5/2021 |
| WO | 2022154975 | 7/2022 |
| WO | 2022154976 | 7/2022 |
| WO | 2022154977 | 7/2022 |
| WO | 2022154978 | 7/2022 |
| WO | 2022154980 | 7/2022 |

* cited by examiner

SUPPORT FOR SECURING A ROBOTIC SYSTEM TO A PATIENT TABLE

CROSS-REFERENCE TO RELATED PATENT APPLICATIONS

This application is a continuation of U.S. application Ser. No. 17/813,154 filed on Jul. 18, 2022, now U.S. Pat. No. 11,844,732, which claims the benefit of U.S. Provisional Application No. 63/203,794 filed on Jul. 30, 2021, entitled SUPPORT FOR SECURING A ROBOTIC SYSTEM TO A PATIENT TABLE, the entire contents of each of which are incorporated by reference.

FIELD

The present invention relates generally to the field of robotic medical procedure systems and, in particular, to a support for securing a robotic system to a patient table.

BACKGROUND

Catheters and other elongated medical devices (EMDs) may be used for minimally-invasive medical procedures for the diagnosis and treatment of diseases of various vascular systems, including neurovascular intervention (NVI) also known as neurointerventional surgery, percutaneous coronary intervention (PCI) and peripheral vascular intervention (PVI). These procedures typically involve navigating a guidewire through the vasculature, and via the guidewire advancing a catheter to deliver therapy. The catheterization procedure starts by gaining access into the appropriate vessel, such as an artery or vein, with an introducer sheath using standard percutaneous techniques. Through the introducer sheath, a sheath or guide catheter is then advanced over a diagnostic guidewire to a primary location such as an internal carotid artery for NVI, a coronary ostium for PCI, or a superficial femoral artery for PVI. A guidewire suitable for the vasculature is then navigated through the sheath or guide catheter to a target location in the vasculature. In certain situations, such as in tortuous anatomy, a support catheter or microcatheter is inserted over the guidewire to assist in navigating the guidewire. The physician or operator may use an imaging system (e.g., fluoroscope) to obtain a cine with a contrast injection and select a fixed frame for use as a roadmap to navigate the guidewire or catheter to the target location, for example, a lesion. Contrast-enhanced images are also obtained while the physician delivers the guidewire or catheter so that the physician can verify that the device is moving along the correct path to the target location. While observing the anatomy using fluoroscopy, the physician manipulates the proximal end of the guidewire or catheter to direct the distal tip into the appropriate vessels toward the lesion or target anatomical location and avoid advancing into side branches.

Robotic catheter-based procedure systems have been developed that may be used to aid a physician in performing catheterization procedures such as, for example, NVI, PCI and PVI. Examples of NVI procedures include coil embolization of aneurysms, liquid embolization of arteriovenous malformations and mechanical thrombectomy of large vessel occlusions in the setting of acute ischemic stroke. In an NVI procedure, the physician uses a robotic system to gain target lesion access by controlling the manipulation of a neurovascular guidewire and microcatheter to deliver the therapy to restore normal blood flow. Target access is enabled by the sheath or guide catheter but may also require an intermediate catheter for more distal territory or to provide adequate support for the microcatheter and guidewire. The distal tip of a guidewire is navigated into, or past, the lesion depending on the type of lesion and treatment. For treating aneurysms, the microcatheter is advanced into the lesion and the guidewire is removed and several embolization coils are deployed into the aneurysm through the microcatheter and used to block blood flow into the aneurysm. For treating arteriovenous malformations, a liquid embolic is injected into the malformation via a microcatheter. Mechanical thrombectomy to treat vessel occlusions can be achieved either through aspiration and/or use of a stent retriever. Depending on the location of the clot, aspiration is either done through an aspiration catheter, or through a microcatheter for smaller arteries. Once the aspiration catheter is at the lesion, negative pressure is applied to remove the clot through the catheter. Alternatively, the clot can be removed by deploying a stent retriever through the microcatheter. Once the clot has integrated into the stent retriever, the clot is retrieved by retracting the stent retriever and microcatheter (or intermediate catheter) into the guide catheter.

In PCI, the physician uses a robotic system to gain lesion access by manipulating a coronary guidewire to deliver the therapy and restore normal blood flow. The access is enabled by seating a guide catheter in a coronary ostium. The distal tip of the guidewire is navigated past the lesion and, for complex anatomies, a microcatheter may be used to provide adequate support for the guidewire. The blood flow is restored by delivering and deploying a stent or balloon at the lesion. The lesion may need preparation prior to stenting, by either delivering a balloon for pre-dilation of the lesion, or by performing atherectomy using, for example, a laser or rotational atherectomy catheter and a balloon over the guidewire. Diagnostic imaging and physiological measurements may be performed to determine appropriate therapy by using imaging catheters or fractional flow reserve (FFR) measurements.

In PVI, the physician uses a robotic system to deliver the therapy and restore blood flow with techniques similar to NVI. The distal tip of the guidewire is navigated past the lesion and a microcatheter may be used to provide adequate support for the guidewire for complex anatomies. The blood flow is restored by delivering and deploying a stent or balloon to the lesion. As with PCI, lesion preparation and diagnostic imaging may be used as well.

When support at the distal end of a catheter or guidewire is needed, for example, to navigate tortuous or calcified vasculature, to reach distal anatomical locations, or to cross hard lesions, an over-the-wire (OTW) catheter or coaxial system is used. An OTW catheter has a lumen for the guidewire that extends the full length of the catheter. This provides a relatively stable system because the guidewire is supported along the whole length. This system, however, has some disadvantages, including higher friction, and longer overall length compared to rapid-exchange catheters (see below). Typically to remove or exchange an OTW catheter while maintaining the position of the indwelling guidewire, the exposed length (outside of the patient) of guidewire must be longer than the OTW catheter. A 300 cm long guidewire is typically sufficient for this purpose and is often referred to as an exchange length guidewire. Due to the length of the guidewire, two operators are needed to remove or exchange an OTW catheter. This becomes even more challenging if a triple coaxial, known in the art as a tri-axial system, is used (quadruple coaxial catheters have also been known to be used). However, due to its stability, an OTW system is often used in NVI and PVI procedures. On the other hand, PCI procedures often use rapid exchange (or monorail) catheters. The guidewire lumen in a rapid exchange catheter runs only through a distal section of the catheter, called the monorail or rapid exchange (RX) section. With a RX system, the operator manipulates the interventional devices parallel to each other (as opposed to with an OTW system, in which the devices are manipulated in a serial configuration), and the exposed length of guidewire only needs to be slightly longer than the RX section of the catheter. A rapid exchange length guidewire is typically 180-200 cm long. Given the shorter length guidewire and monorail, RX catheters can be exchanged by a single operator. However, RX catheters are often inadequate when more distal support is needed.

SUMMARY

In accordance with an implementation a support attaches a mechanism to a patient table having a patient supporting surface and a first rail and a second rail. The support comprising: a base comprising; a first engagement member; a second engagement member; and a single engagement mechanism moving the first engagement member and the second engagement member from a loading position to a secured position securing the base to the first rail and the second rail.

In one implementation the first engagement member is configured to contact a bottom of the first rail and the second engagement member is configured to contact a bottom of the second rail in the secured position.

In one implementation the base includes a first pad contacting the patient supporting surface.

In one implementation the first pad is biased by a biasing member applying a pad force to the patient supporting table.

In one implementation the pad force is substantially constant.

In one implementation the single engagement mechanism secures the base in a cross-table direction, parallel to a patient table plane defining the patient supporting surface, and in a vertical direction perpendicular to the patient supporting surface.

In one implementation the single engagement mechanism includes a cam mechanism having a first cam surface moving the base in the cross-table direction.

In one implementation the cam mechanism includes a second cam surface moving the base in the vertical direction.

In one implementation a medical device system is attached to the support, the medical device system having a center of mass providing a system force onto the first rail and second rail, wherein the pad force and the system force do not exceed a predetermined limit force on the first rail, the second rail and the patient supporting surface.

In one implementation the center of mass of the medical device system moves within a predefined region during active operation of the medical device system and wherein the predetermined limit force is not exceeded.

In one implementation the first pad contacts the patient supporting surface closer to the first rail than the second rail.

In one implementation the first pad contacts the patient supporting surface intermediate the first rail and the second rail.

In one implementation the patient table includes a table marker, and the base includes a base marker, wherein the base marker is aligned with the table marker in the secured position.

In one implementation the single engagement mechanism is actuated by movement of a member in a single direction.

In one implementation an arm is integrated with the base, wherein the base is configured to be removably lowered onto the patient table, to the patient supporting surface.

In one implementation a support attaches a mechanism to a patient table having a patient supporting surface and a first rail and a second rail. The support comprising: a base including a pad positioned intermediate the first rail and the second rail, the pad biased by a biasing member in a first direction, the first pad configured to contact the patient supporting surface of the patient table. A first engagement member is configured to contact the first rail; and a second engagement member is configured to contact the second rail. The pad applies a pad force to the patient supporting surface when the pad is contact with the patient supporting surface.

In one implementation a stop member is connected to the base, the stop member limiting a distance the pad can extend in the first direction and maintaining the biasing member in a preloaded state when the pad is not in contact with the patient supporting surface.

In one implementation a full force of the biasing member is applied to the patient supporting surface when the pad contacts the patient supporting surface and the pad moves in a second direction away from the stop member.

In one implementation a medical device system configured to be attached to the support, the medical device system having a center of mass providing a system force onto the first rail and the second rail, wherein the pad force and the system force do not exceed a predetermined limit force on the first rail, the second rail and the patient supporting surface, wherein the force of the support and the medical device system is distributed between the first rail, the second rail, and the patient supporting surface.

In one implementation a medical device system configured to be attached to the support, the medical device system having a center of mass providing a system force onto the first rail and the second rail, wherein the pad force and the system force does not exceed a predetermined limit force on the first rail, the second rail and the patient supporting surface.

BRIEF DESCRIPTION OF THE DRAWINGS

The invention will become more fully understood from the following detailed description, taken in conjunction with the accompanying drawings, wherein the reference numerals refer to like parts in which.

DETAILED DESCRIPTION OF THE EXAMPLE EMBODIMENTS

Figure 1:
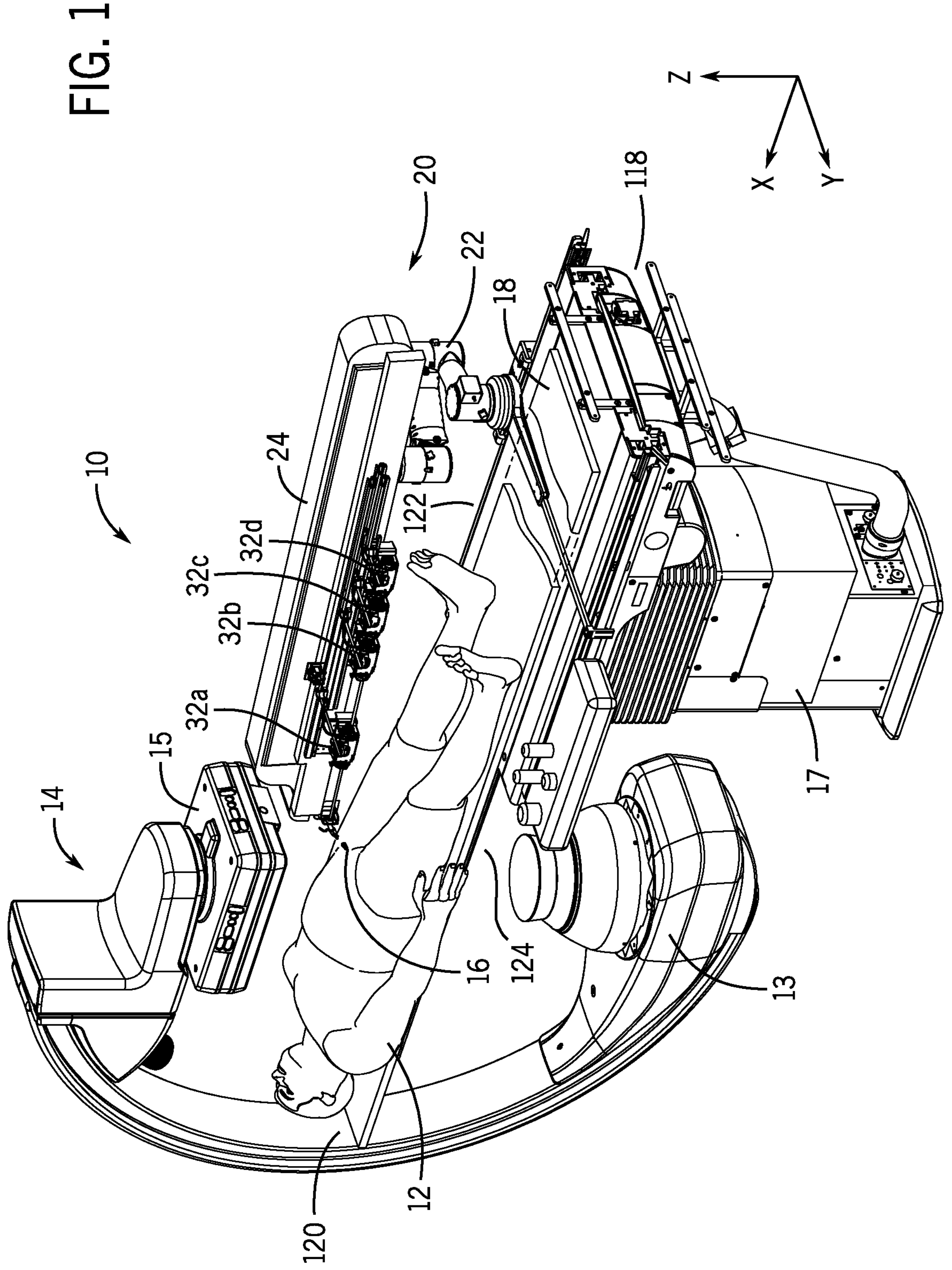
FIG. 1 is a perspective view of an exemplary catheter procedure system in accordance with an embodiment.

FIG. 1 is a perspective view of an example catheter-based procedure system 10 in accordance with an embodiment. Catheter-based procedure system 10 may be used to perform catheter-based medical procedures, e.g., percutaneous intervention procedures such as a percutaneous coronary intervention (PCI) (e.g., to treat STEMI), a neurovascular interventional procedure (NVI) (e.g., to treat an emergent large vessel occlusion (ELVO)), peripheral vascular intervention procedures (PVI) (e.g., for critical limb ischemia (CLI), etc.). Catheter-based medical procedures may include diagnostic catheterization procedures during which one or more catheters or other elongated medical devices (EMDs) are used to aid in the diagnosis of a patient's disease. For example, during one embodiment of a catheter-based diagnostic procedure, a contrast media is injected onto one or more arteries through a catheter and an image of the patient's vasculature is taken. Catheter-based medical procedures may also include catheter-based therapeutic procedures (e.g., angioplasty, stent placement, treatment of peripheral vascular disease, clot removal, arterial venous malformation therapy, treatment of aneurysm, etc.) during which a catheter (or other EMD) is used to treat a disease. Therapeutic procedures may be enhanced by the inclusion of adjunct devices 54 (shown in FIG. 2) such as, for example, intravascular ultrasound (IVUS), optical coherence tomography (OCT), fractional flow reserve (FFR), etc. It should be noted, however, that one skilled in the art would recognize that certain specific percutaneous intervention devices or components (e.g., type of guidewire, type of catheter, etc.) may be selected based on the type of procedure that is to be performed. Catheter-based procedure system 10 can perform any number of catheter-based medical procedures with minor adjustments to accommodate the specific percutaneous intervention devices to be used in the procedure.

Catheter-based procedure system 10 includes, among other elements, a bedside unit 20 and a control station (not shown). Bedside unit 20 includes a robotic drive 24 and a positioning system 22 that are located adjacent to a patient 12. Patient 12 is supported on a patient table 18. The positioning system 22 is used to position and support the robotic drive 24. The positioning system 22 may be, for example, a robotic arm, an articulated arm, a holder, etc. The positioning system 22 may be attached at one end to, for example, the patient table 18 (as shown in FIG. 1), a base, or a cart. The other end of the positioning system 22 is attached to the robotic drive 24. The positioning system 22 may be moved out of the way (along with the robotic drive 24) to allow for the patient 12 to be placed on the patient table 18. Once the patient 12 is positioned on the patient table 18, the positioning system 22 may be used to situate or position the robotic drive 24 relative to the patient 12 for the procedure. In an embodiment, patient table 18 is operably supported by a pedestal 17, which is secured to the floor and/or earth. Patient table 18 is able to move with multiple degrees of freedom, for example, roll, pitch, and yaw, relative to the pedestal 17. Bedside unit 20 may also include controls and displays 46 (shown in FIG. 2). For example, controls and displays may be located on a housing of the robotic drive 24.

Generally, the robotic drive 24 may be equipped with the appropriate percutaneous interventional devices and accessories 48 (shown in FIG. 2) (e.g., guidewires, various types of catheters including balloon catheters, stent delivery systems, stent retrievers, embolization coils, liquid embolics, aspiration pumps, device to deliver contrast media, medicine, hemostasis valve adapters, syringes, stopcocks, inflation device, etc.) to allow a user or operator to perform a catheter-based medical procedure via a robotic system by operating various controls such as the controls and inputs located at the control station. Bedside unit 20, and in particular robotic drive 24, may include any number and/or combination of components to provide bedside unit 20 with the functionality described herein. The robotic drive 24 includes a plurality of device modules 32*a-d* mounted to a rail or linear member. Each of the device modules 32*a-d* may be used to drive an EMD such as a catheter or guidewire. For example, the robotic drive 24 may be used to automatically feed a guidewire into a diagnostic catheter and into a guide catheter in an artery of the patient 12. One or more devices, such as an EMD, enter the body (e.g., a vessel) of the patient 12 at an insertion point 16 via, for example, an introducer sheath.

Bedside unit 20 is in communication with the control station (not shown), allowing signals generated by the user inputs of the control station to be transmitted wirelessly or via hardwire to the bedside unit 20 to control various functions of bedside unit 20. As discussed below, control station 26 may include a control computing system 34 (shown in FIG. 2) or be coupled to the bedside unit 20 through the control computing system 34. Bedside unit 20 may also provide feedback signals (e.g., loads, speeds, operating conditions, warning signals, error codes, etc.) to the control station, control computing system 34 (shown in FIG. 2), or both. Communication between the control computing system 34 and various components of the catheter-based procedure system 10 may be provided via a communication link that may be a wireless connection, cable connections, or any other means capable of allowing communication to occur between components. The control station or other similar control system may be located either at a local site (e.g., local control station 38 shown in FIG. 2) or at a remote site (e.g., remote control station and computer system 42 shown in FIG. 2). Catheter procedure system 10 may be operated by a control station at the local site, a control station at a remote site, or both the local control station and the remote control station at the same time. At a local site, a user or operator and the control station are located in the same room or an adjacent room to the patient 12 and bedside unit 20. As used herein, a local site is the location of the bedside unit 20 and a patient 12 or subject (e.g., animal or cadaver) and the remote site is the location of a user or operator and a control station used to control the bedside unit 20 remotely. A control station (and a control computing system) at a remote site and the bedside unit 20 and/or a control computing system at a local site may be in communication using communication systems and services 36 (shown in FIG. 2), for example, through the Internet. In an embodiment, the remote site and the local (patient) site are away from one another, for example, in different rooms in the same building, different buildings in the same city, different cities, or other different locations where the remote site does not have physical access to the bedside unit 20 and/or patient 12 at the local site.

The control station generally includes one or more input modules 28 configured to receive user inputs to operate various components or systems of catheter-based procedure system 10. In the embodiment shown, control station allows the user or operator to control bedside unit 20 to perform a catheter-based medical procedure. For example, input modules 28 may be configured to cause bedside unit 20 to perform various tasks using percutaneous intervention devices (e.g., EMDs) interfaced with the robotic drive 24 (e.g., to advance, retract, or rotate a guidewire, advance, retract or rotate a catheter, inflate or deflate a balloon located on a catheter, position and/or deploy a stent, position and/or deploy a stent retriever, position and/or deploy a coil, inject contrast media into a catheter, inject liquid embolics into a catheter, inject medicine or saline into a catheter, aspirate on a catheter, or to perform any other function that may be performed as part of a catheter-based medical procedure). Robotic drive 24 includes various drive mechanisms to cause movement (e.g., axial and rotational movement) of the components of the bedside unit 20 including the percutaneous intervention devices.

In one embodiment, input modules 28 may include one or more touch screens, joysticks, scroll wheels, and/or buttons. In addition to input modules 28, the control station 26 may use additional user controls 44 (shown in FIG. 2) such as foot switches and microphones for voice commands, etc. Input modules 28 may be configured to advance, retract, or rotate various components and percutaneous intervention devices such as, for example, a guidewire, and one or more catheters or microcatheters. Buttons may include, for example, an emergency stop button, a multiplier button, device selection buttons and automated move buttons. When an emergency stop button is pushed, the power (e.g., electrical power) is shut off or removed to bedside unit 20. When in a speed control mode, a multiplier button acts to increase or decrease the speed at which the associated component is moved in response to a manipulation of input modules 28. When in a position control mode, a multiplier button changes the mapping between input distance and the output commanded distance. Device selection buttons allow the user or operator to select which of the percutaneous intervention devices loaded into the robotic drive 24 are controlled by input modules 28. Automated move buttons are used to enable algorithmic movements that the catheter-based procedure system 10 may perform on a percutaneous intervention device without direct command from the user or operator 11. In one embodiment, input modules 28 may include one or more controls or icons (not shown) displayed on a touch screen (that may or may not be part of a display), that, when activated, causes operation of a component of the catheter-based procedure system 10. Input modules 28 may also include a balloon or stent control that is configured to inflate or deflate a balloon and/or deploy a stent. Each of the input modules 28 may include one or more buttons, scroll wheels, joysticks, touch screen, etc. that may be used to control the particular component or components to which the control is dedicated. In addition, one or more touch screens may display one or more icons (not shown) related to various portions of input modules 28 or to various components of catheter-based procedure system 10.

Catheter-based procedure system 10 also includes an imaging system 14. Imaging system 14 may be any medical imaging system that may be used in conjunction with a catheter based medical procedure (e.g., non-digital X-ray, digital X-ray, CT, MRI, ultrasound, etc.). In an exemplary embodiment, imaging system 14 is a digital X-ray imaging device that is in communication with the control station. In one embodiment, imaging system 14 may include a C-arm (shown in FIG. 1) that allows imaging system 14 to partially or completely rotate around patient 12 in order to obtain images at different angular positions relative to patient 12 (e.g., sagittal views, caudal views, anterior-posterior views, etc.). In one embodiment imaging system 14 is a fluoroscopy system including a C-arm having an X-ray source 13 and a detector 15, also known as an image intensifier.

Imaging system 14 may be configured to take X-ray images of the appropriate area of patient 12 during a procedure. For example, imaging system 14 may be configured to take one or more X-ray images of the head to diagnose a neurovascular condition. Imaging system 14 may also be configured to take one or more X-ray images (e.g., real time images) during a catheter-based medical procedure to assist the user or operator 11 of control station 26 to properly position a guidewire, guide catheter, microcatheter, stent retriever, coil, stent, balloon, etc. during the procedure. The image or images may be displayed on display 30. For example, images may be displayed on a display to allow the user or operator to accurately move a guide catheter or guidewire into the proper position.

In order to clarify directions, a rectangular coordinate system is introduced with X, Y, and Z axes. The positive X axis is oriented in a longitudinal (axial) distal direction, that is, in the direction from the proximal end to the distal end, stated another way from the proximal to distal direction. The Y and Z axes are in a transverse plane to the X axis, with the positive Z axis oriented up, that is, in the direction opposite of gravity, and the Y axis is automatically determined by right-hand rule.

Figure 2:
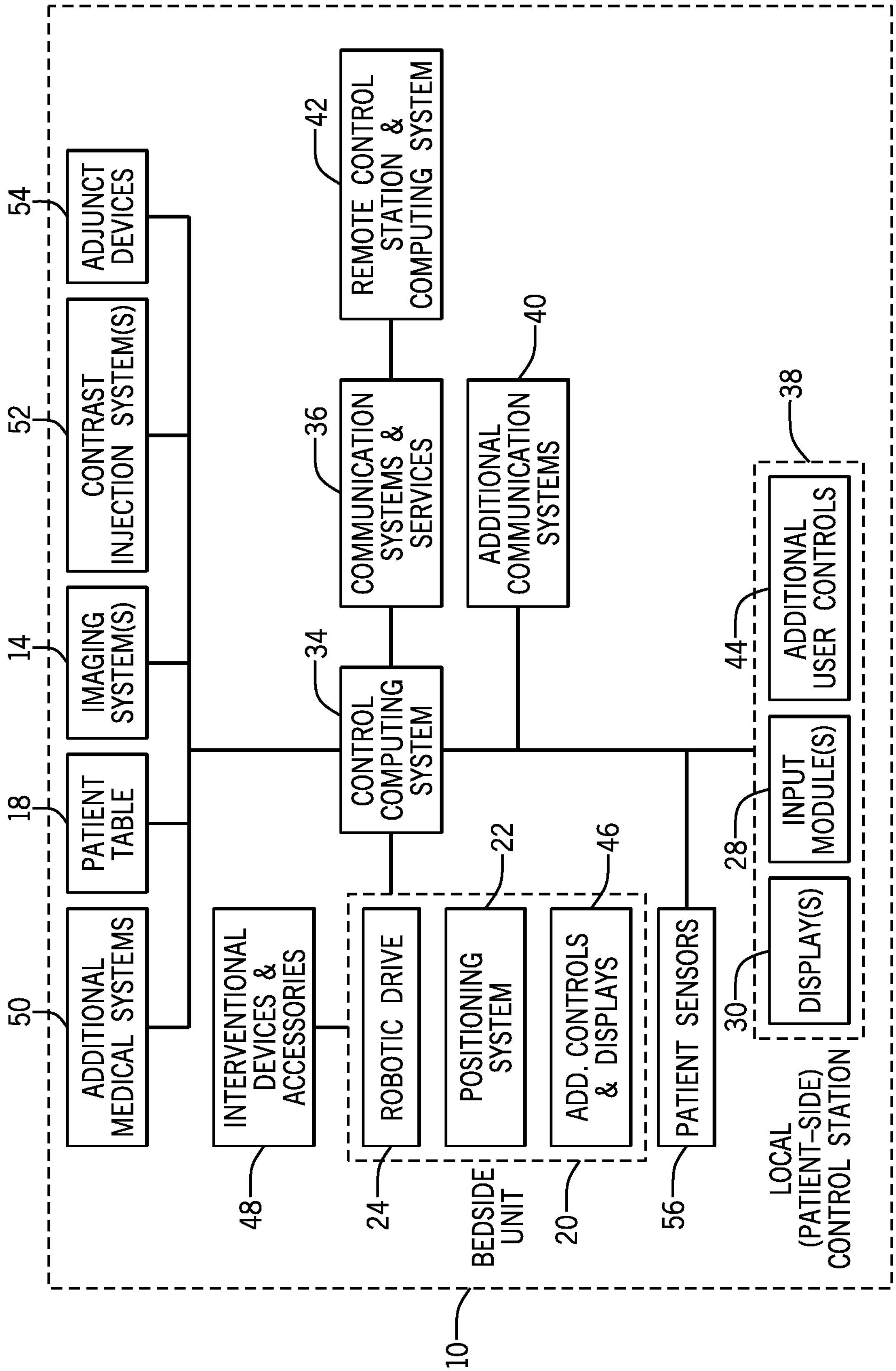
FIG. 2 is a schematic block diagram of an exemplary catheter procedure system in accordance with an embodiment.

FIG. 2 is a block diagram of catheter-based procedure system 10 in accordance with an example embodiment. Catheter-procedure system 10 may include a control computing system 34. Control computing system 34 may physically be, for example, part of a control station. Control computing system 34 may generally be an electronic control unit suitable to provide catheter-based procedure system 10 with the various functionalities described herein. For example, control computing system 34 may be an embedded system, a dedicated circuit, a general-purpose system programmed with the functionality described herein, etc. Control computing system 34 is in communication with bedside unit 20, communications systems and services 36 (e.g., Internet, firewalls, cloud services, session managers, a hospital network, etc.), a local control station 38, additional communications systems 40 (e.g., a telepresence system), a remote control station and computing system 42, and patient sensors 56 (e.g., electrocardiogram (ECG) devices, electroencephalogram (EEG) devices, blood pressure monitors, temperature monitors, heart rate monitors, respiratory monitors, etc.). The control computing system is also in communication with imaging system 14, patient table 18, additional medical systems 50, contrast injection systems 52 and adjunct devices 54 (e.g., IVUS, OCT, FFR, etc.). The bedside unit 20 includes a robotic drive 24, a positioning system 22 and may include additional controls and displays 46. As mentioned above, the additional controls and displays may be located on a housing of the robotic drive 24. Interventional devices and accessories 48 (e.g., guidewires, catheters, etc.) interface to the bedside system 20. In an embodiment, interventional devices and accessories 48 may include specialized devices (e.g., IVUS catheter, OCT catheter, FFR wire, diagnostic catheter for contrast, etc.) which interface to their respective adjunct devices 54, namely, an IVUS system, an OCT system, and FFR system, etc.

In various embodiments, control computing system 34 is configured to generate control signals based on the user's interaction with input modules 28 (e.g., of a control station such as a local control station 38 or a remote control station 42) and/or based on information accessible to control computing system 34 such that a medical procedure may be performed using catheter-based procedure system 10. The local control station 38 includes one or more displays 30, one or more input modules 28, and additional user controls 44. The remote control station and computing system 42 may include similar components to the local control station 38. The remote 42 and local 38 control stations can be different and tailored based on their required functionalities. The additional user controls 44 may include, for example, one or more foot input controls. The foot input control may be configured to allow the user to select functions of the imaging system 14 such as turning on and off the X-ray and scrolling through different stored images. In another embodiment, a foot input device may be configured to allow the user to select which devices are mapped to scroll wheels included in input modules 28. Additional communication systems 40 (e.g., audio conference, video conference, telepresence, etc.) may be employed to help the operator interact with the patient, medical staff (e.g., angio-suite staff), and/or equipment in the vicinity of the bedside.

Catheter-based procedure system 10 may be connected or configured to include any other systems and/or devices not explicitly shown. For example, catheter-based procedure system 10 may include image processing engines, data storage and archive systems, automatic balloon and/or stent inflation systems, medicine injection systems, medicine tracking and/or logging systems, user logs, encryption systems, systems to restrict access or use of catheter-based procedure system 10, etc.

As mentioned, control computing system 34 is in communication with bedside unit 20 which includes a robotic drive 24, a positioning system 22 and may include additional controls and displays 46, and may provide control signals to the bedside unit 20 to control the operation of the motors and drive mechanisms used to drive the percutaneous intervention devices (e.g., guidewire, catheter, etc.). The various drive mechanisms may be provided as part of a robotic drive 24.

Figure 3:
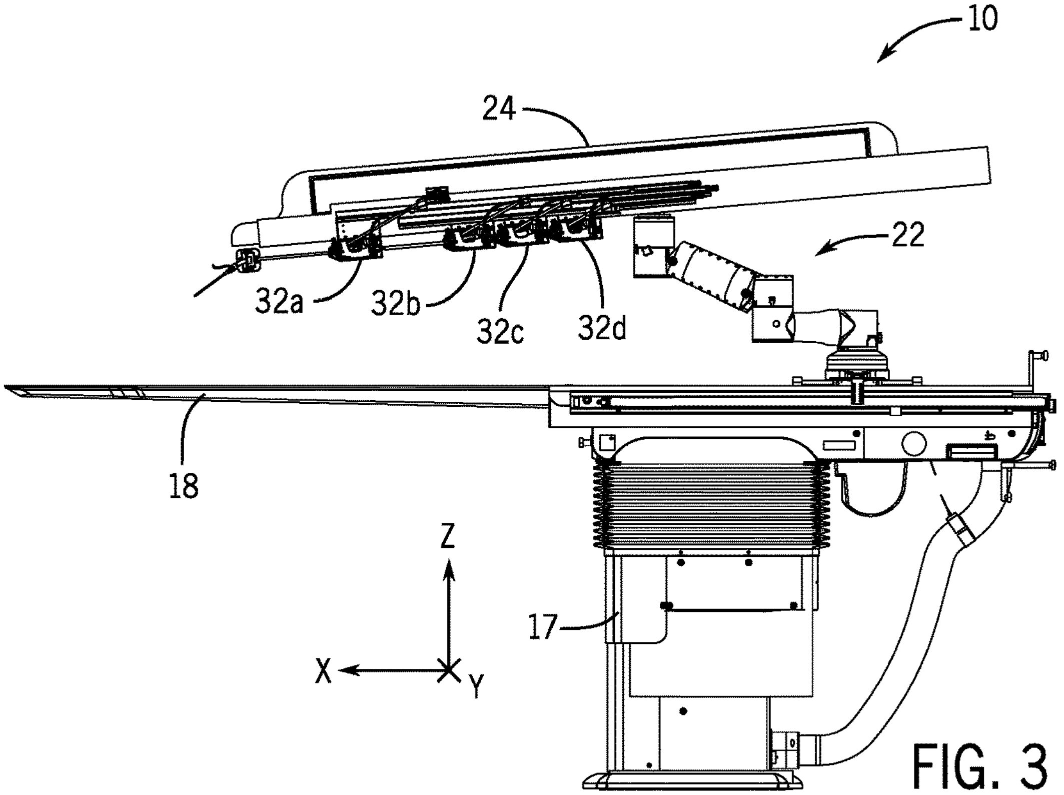
FIG. 3 is a side view of example catheter-based procedure system of FIG. 1 with certain components removed for clarity.

Referring now to FIG. 3, a side view of the example catheter-based procedure system 10 of FIG. 1 is illustrated with certain components (e.g., patient, C-arm) removed for clarity. As described above with reference to FIG. 1, the patient table 18 is supported on the pedestal 17, and the robotic drive 24 is mounted to the patient table with a positioning system 22. The positioning system 22 allows manipulation of the robotic drive 24 relative to the patient table 18. In this regard, the positioning system 22 is securely mounted to the patient table 18 and includes various joints and links/arms to allow the manipulation, as described below with reference to FIG. 4.

Figure 4:
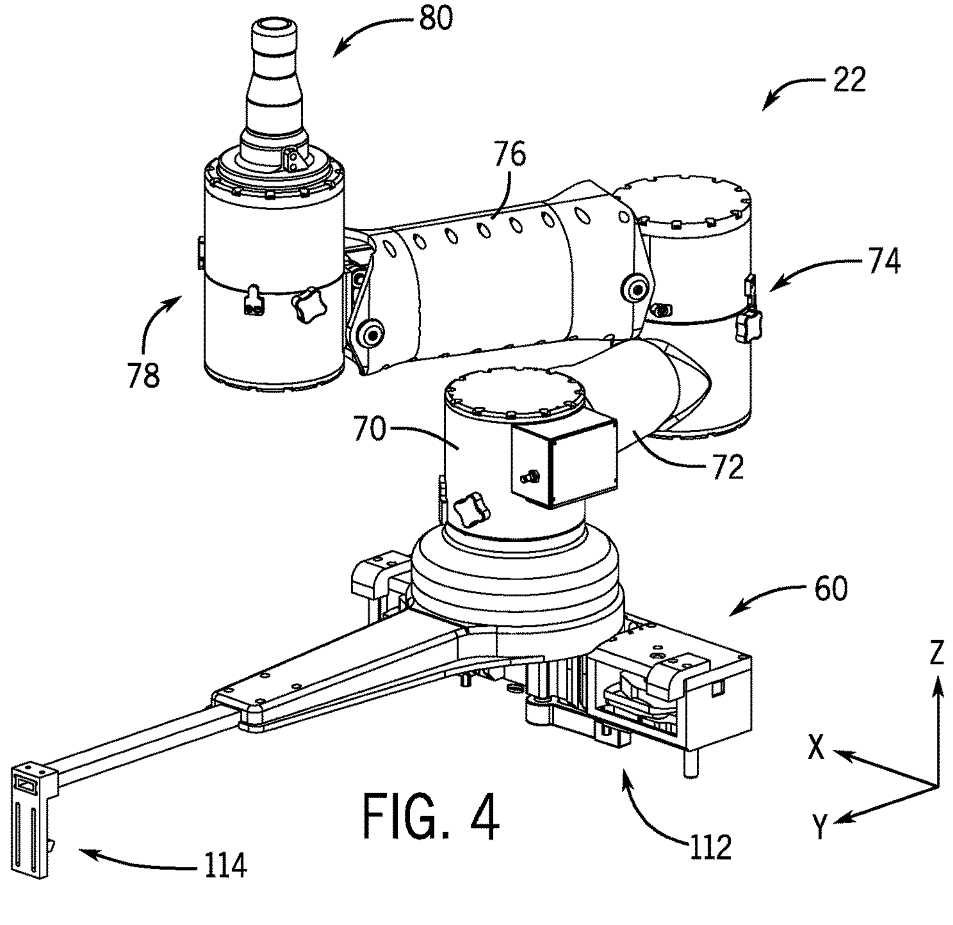
FIG. 4 is a perspective view of an example positioning system for a robotic drive in accordance with an embodiment.

FIG. 4 is a perspective view of an example positioning system 22 for a robotic drive in accordance with an embodiment. The positioning system 22 includes a mounting arrangement 60 to securely mount the positioning system 22 to the patient table 18. The mounting arrangement 60 includes an engagement mechanism to engage a first engagement member with a first longitudinal rail and a second engagement member with a second longitudinal rail to removably secure the positioning system to the patient bed.

The positioning system 22 includes various segments and joints coupling to allow the robotic drive 24 to be positioned as desired, for example, relative to the patient. The positioning system 22 includes a first rotational joint 70 coupled to the mounting arrangement 60. The first rotational joint 70 allows rotation of a first arm 72, or link, about a rotational axis. In the illustrated example, the mounting arrangement 60 is in a substantially horizontal plane (e.g., the plane of the patient table 18), and the rotational axis is substantially vertical and runs through the center of the first rotational joint 70. The first rotational joint 70 can include circuitry to allow a user to control the rotation of the first rotational joint 70.

In the illustrated example, the first arm 72 is substantially horizontal with a first end coupled to the first rotational joint 70. The second end of the first arm 72 is coupled to a second rotational joint 74. In addition, the second rotational joint 74 is also coupled to a first end of a second arm 76. Thus, the second rotational joint 74 allows rotation of the second arm 76 relative to the first arm 72. As with the first rotational joint 70, the second rotational joint 74 allows rotation about a substantially vertical axis running through the center of the second rotational joint 74. Further, the second rotational joint 74 can include circuitry to allow a user to control the rotation of the second rotational joint 74.

In the illustrated example, a second end of the second arm 76 is coupled to a third rotational joint 78. The third rotational joint 78 includes a post 80 to allow mounting of the robotic drive 24 to the positioning system 22. Thus, the third rotational joint 78 allows rotation of the robotic drive 24 relative to the second arm 76. The third rotational joint 78 allows rotation about a substantially vertical axis running through the center of the third rotational joint 78. Further, the third rotational joint 78 can include circuitry to allow a user to control the rotation of the third rotational joint 78.

In one example, the second arm 76 includes a 4-arm linkage which can allow limited vertical movement of third rotational joint 78 relative to the second rotational joint 74. In this regard, the 4-arm linkage can allow vertical movement of the third rotational join 78, while maintaining the substantially vertical orientation of the third rotational joint 78 and the post 80

Figure 5:
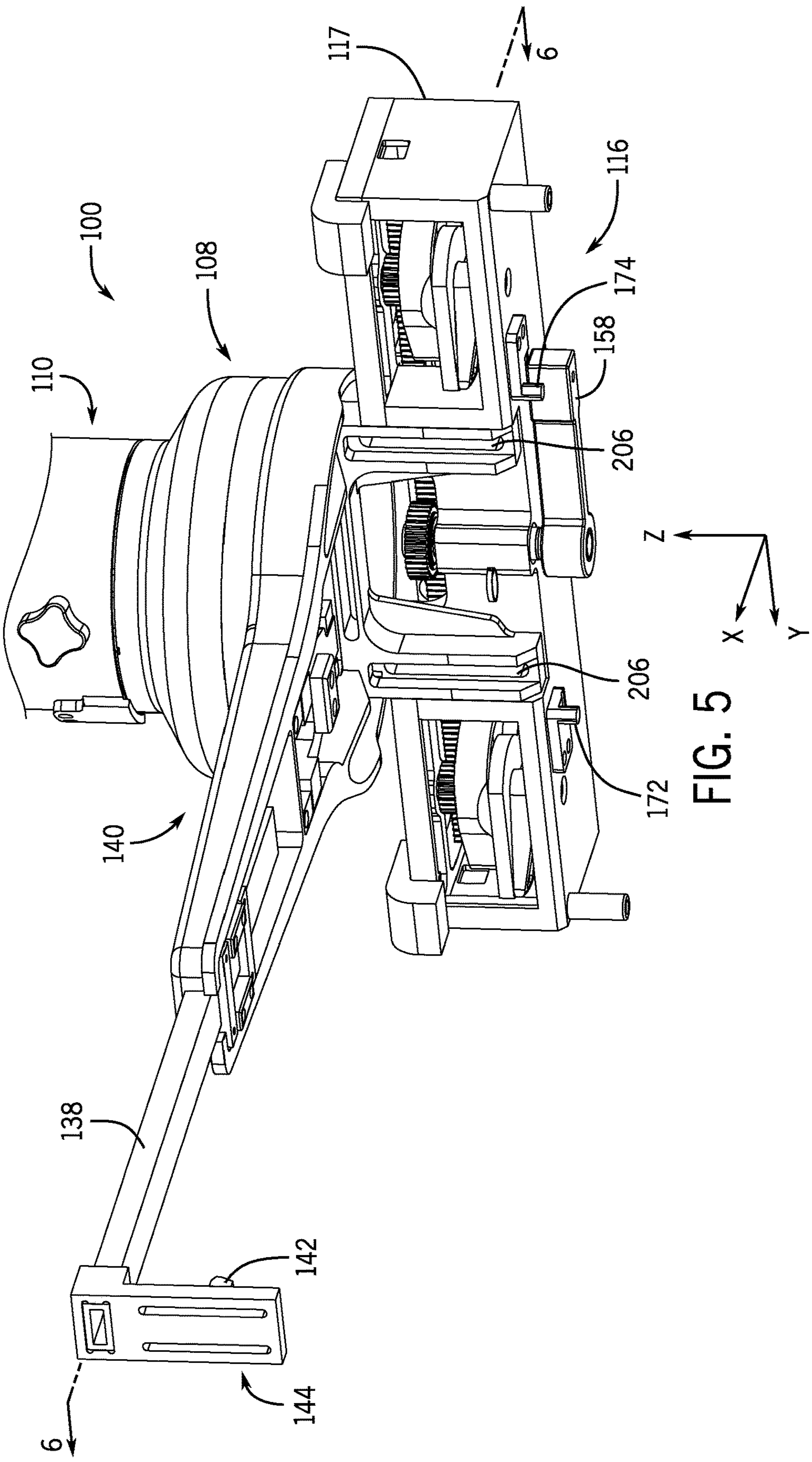
FIG. 5 a partial bottom isometric view of the support of FIG. 4.

Referring to FIG. 4 and FIG. 5 mounting arrangement 60 in one implementation includes a support 100 for attaching a mechanism such as a robotic drive 24 to a patient table 18 having a patient supporting surface 102, a first rail 104 and an opposing second rail 106. Support 100 includes a base 108. In one implementation base 108 includes an articulated arm 110 integrated therewith to support the mechanism such as robotic drive 24. Support 100 includes a first engagement member 112 and a second engagement member 114. An engagement mechanism 116 operatively moves first engagement member 112 and moves second engagement member 114 from a loading position to a secured position securing base 108 to first rail 104 and opposing second rail 106.

Figure 11A:
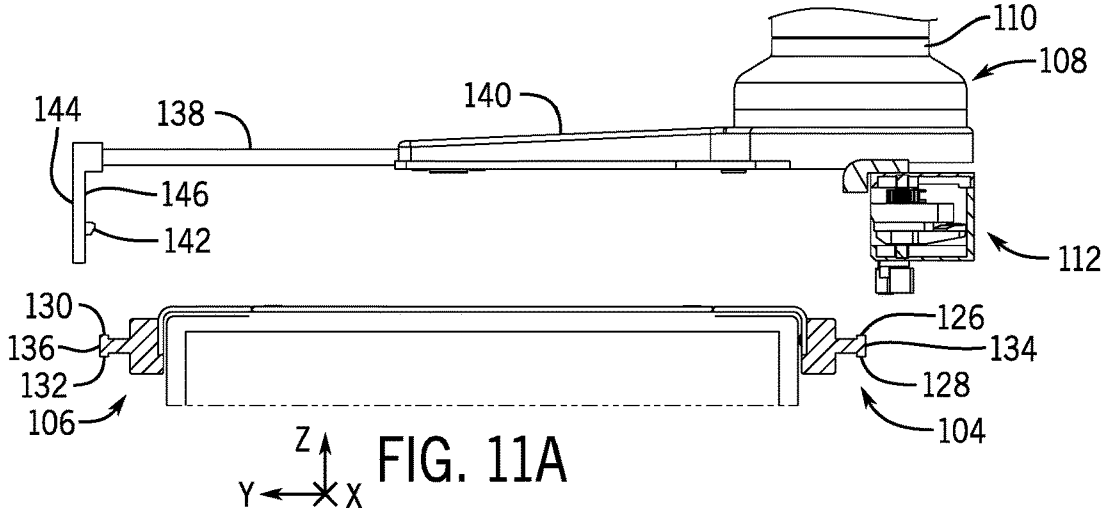
FIG. 11A is a view of the support being loaded onto the patient table.

Referring to FIG. 1 and FIG. 11A patient table 18 includes a patient supporting surface 102 having a first longitudinal end 118 and an opposing second longitudinal end 120. In one implementation in an-use orientation a patient's head is closer to first longitudinal end 118 than second longitudinal end 120, and the patient's feet are closer to opposing second longitudinal end 120 than first longitudinal end 118. When a patient is lying face up on patient table 18 the patient's left side is proximate the first longitudinal side 122 and the patient's right side is proximate a second longitudinal side 124. First rail 104 extends from an outer periphery of the first longitudinal side 122 away from the second longitudinal side 124. Second rail 106 extends from an outer periphery of the second longitudinal side 124 in a direction away from first longitudinal side 122.

In one in-use orientation patient supporting surface 102 is horizontal such that the direction of gravity is perpendicular to a plane defined by the patient supporting surface. Referring to the X, Y and Z axes the patient supporting surface is parallel to the X-Y plane. The direction perpendicular to the plane defined by the patient supporting surface is referred to herein as the vertical direction and movement along the vertical direction in the direction of gravity is referred to as lowering. Stated another way the vertical direction as used herein refers to direction along the Z axis. A surface of patient table 18 that faces away from the direction of gravity in the patient table in-use position is referred to as the upper surface and a surface that faces toward the direction of gravity in the patient table in-use position is referred to as the lower surface.

Referring to FIG. 11A first rail 104 includes a first rail upper surface 126 and a first rail lower surface 128, where the first rail upper surface 126 is closer to the patient table supporting surface 102 than the first rail lower surface 128. Similarly, opposing second rail 106 includes a second rail upper surface 130 and an opposing second rail lower surface 132, where the second rail upper surface 130 is closer to the patient table supporting surface 102 than the second rail lower surface 132. First rail 104 includes an outer surface 134 extending between first rail upper surface 126 and first rail lower surface 128. Outer surface 134 faces away from second rail 106. Second rail 106 includes an outer surface 136.

Referring to FIG. 5 Base 108 includes a cross-arm 138 supporting the second engagement member 114. Cross-arm 138 slidably extends from a body 140 of base 108. Cross-arm 138 can be adjusted relative to body 140 to accommodate patient beds having different cross-bed dimensions. First engagement member 112 can be adjusted in the vertical direction (Z-axis) by adjustment 206 connecting first engagement member housing 117 to body 140. The cross-table direction is the direction extending perpendicular from outer surface 134 of first rail 104 toward outer surface 136 of second rail 106. Second engagement member 114 includes a tab 142 that can be positioned along vertically extending member 144 of cross-arm 138. Cross-arm 138 includes a first member 139 extending generally parallel to a plane defined by patient supporting surface 102. The cross-table direction is along the Y axis. The positive Y axis direction or cross-table direction is the direction from the first rail 104 toward the second rail 106. In one implementation first member 139 of cross-arm 138 telescopically extends from body 140 of base 108. Vertically extending member 144 includes an engagement surface 146 facing toward patient second rail 106. Member 144 extends in a downward direction away from patient supporting surface 102. The position of tab 142 can be adjusted along the Z-axis direction to accommodate differing heights between second rail 106 and patient supporting surface 102. Similarly, as noted above the engagement mechanism 116 can be adjusted along the Z-axis direction via adjustment 206 to accommodate differing heights between first rail 104 and patient supporting surface 102.

In one implementation support 100 is placed on patient table 18 at a specific location along the longitudinal axis. A marker such as a table marker or other table indicia is placed at a specific location along the longitudinal axis of patient table 18. Support 100 has indicia that is aligned with the table indicia so that the robotic mechanism can move within a predefined range of motion. The alignment of support 100 on patient table 18 as discussed aids in avoiding interference between robotic drive 24 and imaging system 14. Additionally, alignment of support 100 on patient table 18 assists in positioning robotic drive 24 relative to a patient without running out of reach. In one implementation table marker may be permanently clamped to first rail 104 and table marker may include two portions that are located on either side longitudinally along first rail 104 along the X-axis such that engagement mechanism 116 is located between the two portions of the table marker.

Support 100 is lowered onto patient table 18 directly at the desired longitudinal position. Support 100 does not need to be installed at the distal end of patient table 18 and then slid along first rail 104 and second rail 106 to the desired longitudinal position. Similarly, removal of support 100 in one implementation as discussed herein upon release of first engagement member 112 and second engagement member 114 may be accomplished by raising the support away from patient table 18 without having to slide support along the longitudinal axis. In this manner support 100 is lowered to an in-use position at the desired position along the longitudinal axis of patient table 18 between the first longitudinal end 118 and opposing second longitudinal end 120. Similarly, support 100 may be quickly removed from patient table 18 by raising the support 100 from patient table 18 without having to first slide support 100 toward either first longitudinal end 118 or opposing second longitudinal end 120. This allows for quick removal from patient table 18 if the need should arise.

Referring to FIG. 11A, support 100 is lowered onto patient table 18 in a generally downward direction at a predetermined longitudinal position. In one implementation support 100 is lowered onto patient table 18 while cross-arm 138 is generally parallel to a plane defined by the patient supporting surface 102. In another implementation a rest tab, support member or ledge 119 of first engagement member 112 rests on first rail upper surface 126 as support 100 is pivoted about first rail upper surface 126 until a portion of cross-arm 138 contacts patient supporting surface 102. Both lowering support 100 along a vector parallel to a direction perpendicular to patient supporting surface 102 and lowering support 100 by first contacting ledge 119 of support 100 on first rail upper surface 126 and then lowering cross-arm onto patient supporting surface 102 results in support 100 being in a first loading position. In one implementation a user first lowers the region of support 100 proximate second engagement member 114 onto the region of patient table 18 proximate second rail 106 and then lowers the first engagement member 112 toward first rail 104.

Figure 11B:
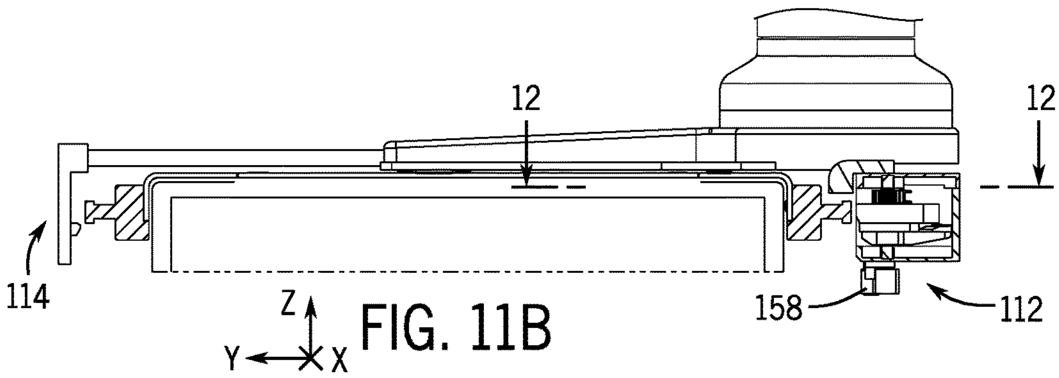
FIG. 11B is a side view of the support after being first lowered onto the patient table.
Figure 12:
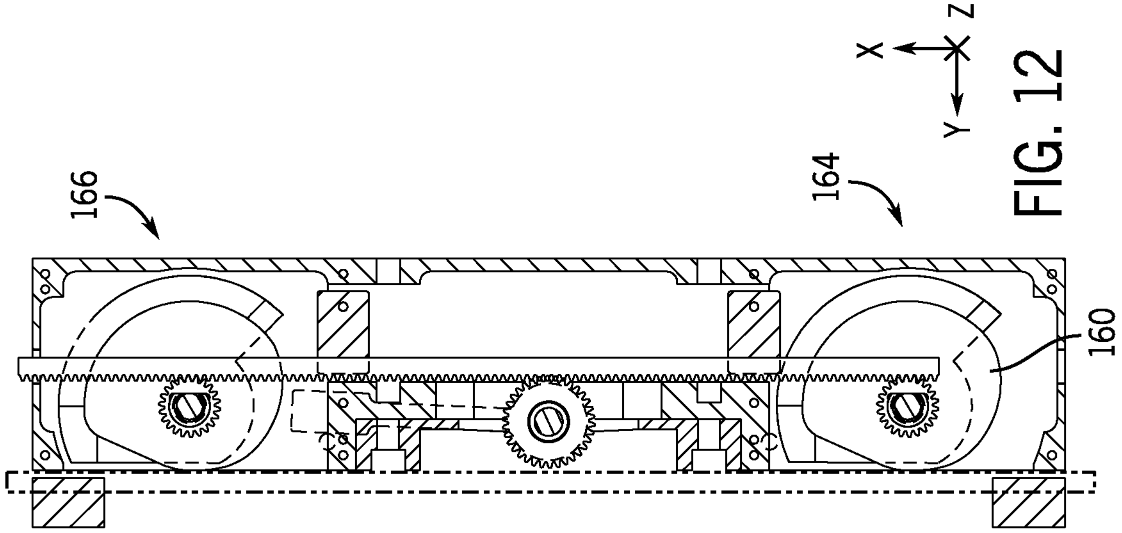
FIG. 12 is a cross section of the engagement mechanism taken generally along line 12-12 of FIG. 11B.

Referring to FIG. 11B and FIG. 12 in a first position in which support 100 has been lowered onto patient 12 first engagement member 112 and second engagement member 114 are spaced from first rail 104 and second rail 106 respectively. Stated another way the distance between outer surface 134 of first rail 104 and outer surface 136 of second rail 106 is less than the distance between first engagement member 112 and second engagement member 114 in the cross-table direction.

Figure 11C:
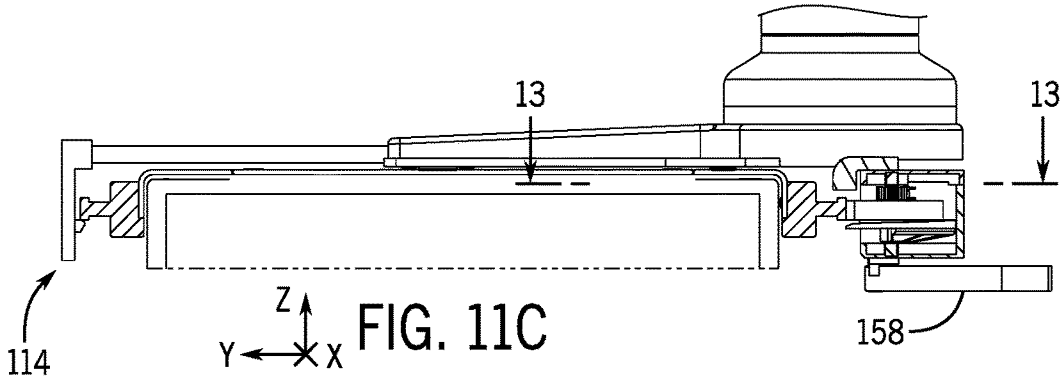
FIG. 11C is a side view of the support being moved in a cross-table direction.
Figure 13A:
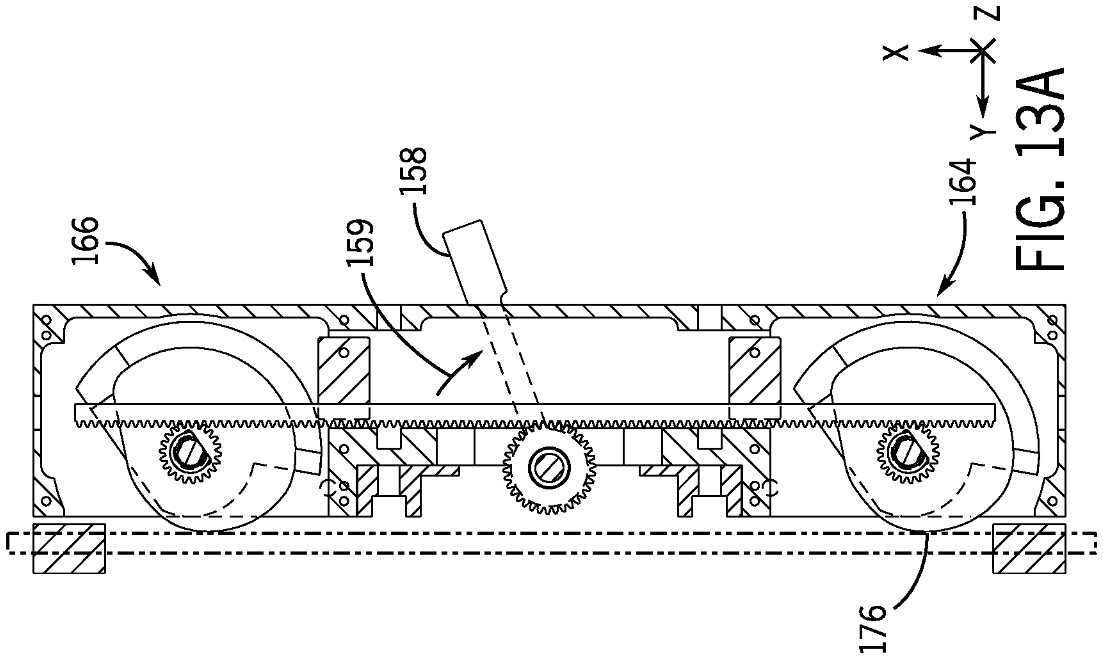
FIG. 13A is a cross section of the engagement mechanism taken generally along line 13-13 of FIG. 11C in one position.
Figure 13B:
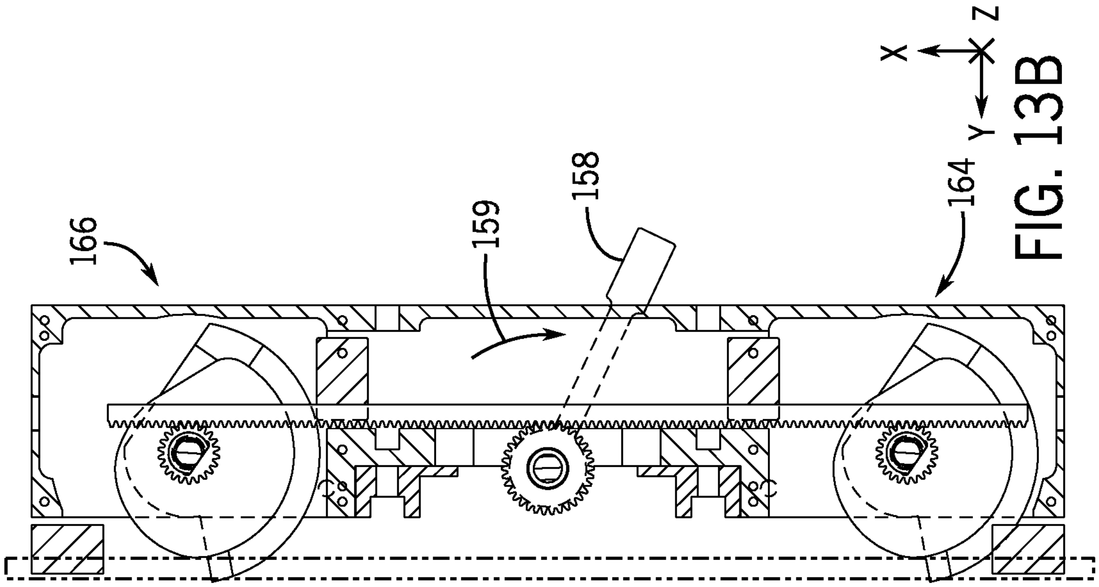
FIG. 13B is a cross section of the engagement mechanism taken generally along line 13-13 of FIG. 11C in another position different than the position shown in FIG. 13A.

Referring to FIG. 11C and FIG. 13A and FIG. 13B in a second position support is moved in the cross-table direction by engagement mechanism 116 such that outer surface 134 of first rail 104 and outer surface 136 of second rail 106 are contacted by engagement mechanism 116. Referring to FIG. 13B in a third position support is moved further in a cross-table direction from first rail 104 toward second rail 106 and first engagement member 112 begins to contact first rail lower surface 128.

Figure 11D:
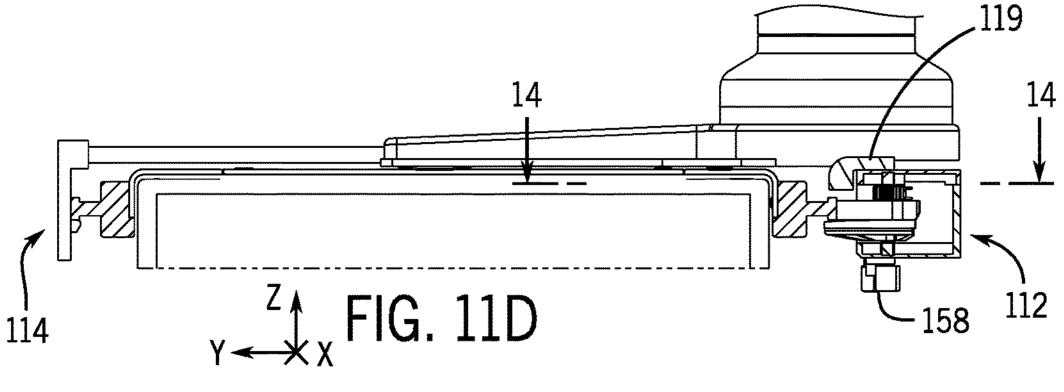
FIG. 11D is a side view of the support being moved in a vertical direction.
Figure 14:
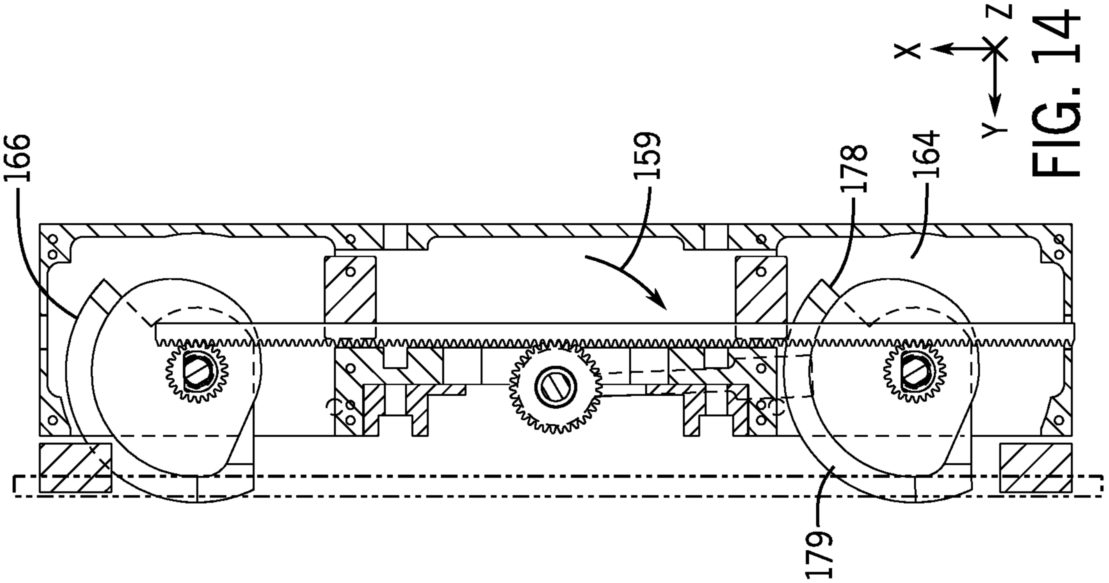
FIG. 14 is a cross section of the engagement mechanism taken generally along line 14-14 of FIG. 11D in the locked position.

Referring to FIG. 11D and FIG. 14 in the fully secured position, first engagement member 112 contacts first rail lower surface 128 and outer surface 134 of first rail 104 and second engagement member 114 contacts opposing second rail lower surface 132 and outer surface 136 of second engagement member 114. In the fully secured position base 108 contacts patient supporting surface 102. A first pad 150 extending from a lower surface of body 140 contacts patient supporting surface 102. In one implementation in the fully secured position ledge 119 does not contact first rail upper surface 126 of first rail 104. Stated another way in one implementation in the fully secured position support 100 does not contact second rail upper surface 130 and first rail upper surface 126. However, in use first rail upper surface 126 does contact a portion 121 of support member 119 in response to a pitch moment. In one implementation by design there is a clearance between first rail upper surface 126 and portion 121 of support member 119 between 0.0-0.2 mm. In operation given however, portion 121 contacts first rail upper surface 126 on at least some longitudinal areas of first rail 104. Note that the gap between first rail upper surface 126 and portion 121 can be adjusted by movement of support member 119 relative to first engagement member housing 117. In one implementation support member 119 is attached to first engagement member housing 117 with a fastener and at least one shim maybe added or removed between support member 119 and first engagement member housing 117 to change the distance between support member 119 and first rail upper surface 126. In one implementation in addition to first pad 150 a second pad 152 extending downwardly from support 100 contacts patient supporting surface 102. Depending on the location of the force applied by support 100 a portion of support 100 does contact first rail upper surface 126. Depending on the location of force second pad 152 may not contact patient supporting surface 102 and only one of the two cam assemblies contacts first rail 104 in the Z-axis direction. For certain locations of the force from support 100 both first pad 150 and second pad 152 and/or both cam assemblies contact patient supporting surface 102 and first rail 104 respectively.

Patient tables include a first and second longitudinally extending rail on the right side and left side of the patient table. A number of different devices are supported on the right and left rails. The first rail and the second rail can support a certain amount of mass before the force applied to the first rail and/or second rail lose their ability to positively locate the device relative to the patient supporting surface. While rails are often rated on weight the location of force of the devices secured to the rail may apply an undesirable torque to the rails. Devices that have significant mass may bend and/or torque the first rail 104 and/or second rail 106. As further described herein first pad 150 is biased by a biasing member applying a pad force to patient supporting surface 102. In one implementation the pad force is substantially constant during movement of the arm and robotic drive. The pad force acts to counter act the forces applied to patient table 18 from the support and robotic drive 24. In one implementation springs 180 are preloaded so that as soon as the pad is displaced from the hard stops 151 the full force of springs 180 are applied.

Referring to FIG. 5, FIG. 8, FIG. 9, FIG. 10A and FIG. 10B engagement mechanism 116 is a single engagement mechanism that moves first engagement member 112 and second engagement member 114 from the loading position to the secured position securing base 108 to first rail 104 and second rail 106. In one implementation engagement mechanism 116 secures base 108 in a cross-table (Y-Axis) direction and a vertical direction (Z-Axis). Stated another way single engagement mechanism 116 secures base 108 in a cross-table direction parallel to a patient table plane defined the patient supporting surface 102 and a vertical direction perpendicular to the patient supporting surface 102.

Engagement mechanism 116 includes a mechanism having a first cam assembly 156 operated by a handle 158 through a rack gear 162. Handle 158 can be any actuator known in the art, such as a button, dial, gear, handle or similar devices. First cam assembly 156 includes a first cam surface 160 that acts to move base 108 in the cross-table (Y-axis) direction and a second cam surface 164 that acts to move base 108 in the vertical (Z-axis) direction. In one implementation engagement mechanism 116 includes a second cam assembly 166 similar to first cam assembly 156 and rotationally linked to first cam assembly 156 via rack gear 162. While a rack and pinion device is one option other linkage devices can be used. Movement of handle 158 from a first position in which first cam assembly 156 and second cam assembly 166 are free from and not in contact with first rail 104 to a second position in which first cam assembly 156 and second cam assembly 166 are in direct contact with first rail 104. In one implementation handle moves 180 degrees from the first position to the second position, though other degrees of rotation are contemplated such as 90 degrees or other amount of movement. It is noted that the angle of handle rotation does not need to equal the angle of the cam rotation. In one implementation the angle of cam rotation is greater than the angle of handle rotation. Referring to FIG.

13A, 13B and FIG. 14 handle 158 is moved in an engagement direction 159 to engage first engagement member 112 and second engagement member 114 with first rail 104 and second rail 106.

Movement of handle 158 about pivot axis 168 rotates first cam assembly 156 and second cam assembly 166 through a rack gear 162 and pinion 170. Handle 158 contacts a first stop 172 in the first position and a second stop 174 in the second position. As handle 158 moves from the handle first position to the second handle position a first region 176 of first cam surface 160 contacts outer surface 134 of first rail 104 thereby moving the support 100 in the cross-table direction from second rail 106 toward first rail 104. In this manner engagement surface 146 of second engagement member 114 contacts outer surface 136 of second rail 106 and tab 142. Tab 142 has a beveled surface 143 that engages opposing second rail lower surface 132 as support 100 is moved in the cross-table direction from second rail 106 toward first rail 104.

After movement of handle 158 first from the first handle position to the second handle position a first beveled portion 178 of second cam surface 164 contacts first rail lower surface 128 of first rail 104 and progressively engages a second portion 179 of second cam surface 164 thereby moving support 100 in a downward direction along the negative z-axis. Once handle is moved to the second handle position, support 100 is secured to patient table 18. In one implementation handle 158 is moved in a single motion to secure support 100 to patient table 18 in both the cross-table direction (Y-axis) and vertical direction (Z-axis). Releasing support 100 from patient table 18 is accomplished by moving handle 158 from the second handle position to a first handle position. Note that in one implementation first cam surface 160 contacts first rail 104 before second cam surface 164 contacts first rail 104.

A single handle 158 is moved to operatively engage first engagement member 112 and second engagement member 114 with first rail 104 and second rail 106 as well as engage first pad 150 with patient supporting surface 102. Engagement mechanism 116 by use of a single actuator 158 moving in a single direction about pivot axis 168 operatively engages and disengages support 100 from patient table 18.

Referring to FIG. 11C and FIG. 11D, as handle 58 moves from the first handle position to a position intermediate the first handle position and the second handle position support 100 is first moved in the cross-table direction (−Y axis direction) and then second cam surface engages first rail lower surface 128 thereby moving support 100 in a downward (−Z axis) direction.

Figure 6:
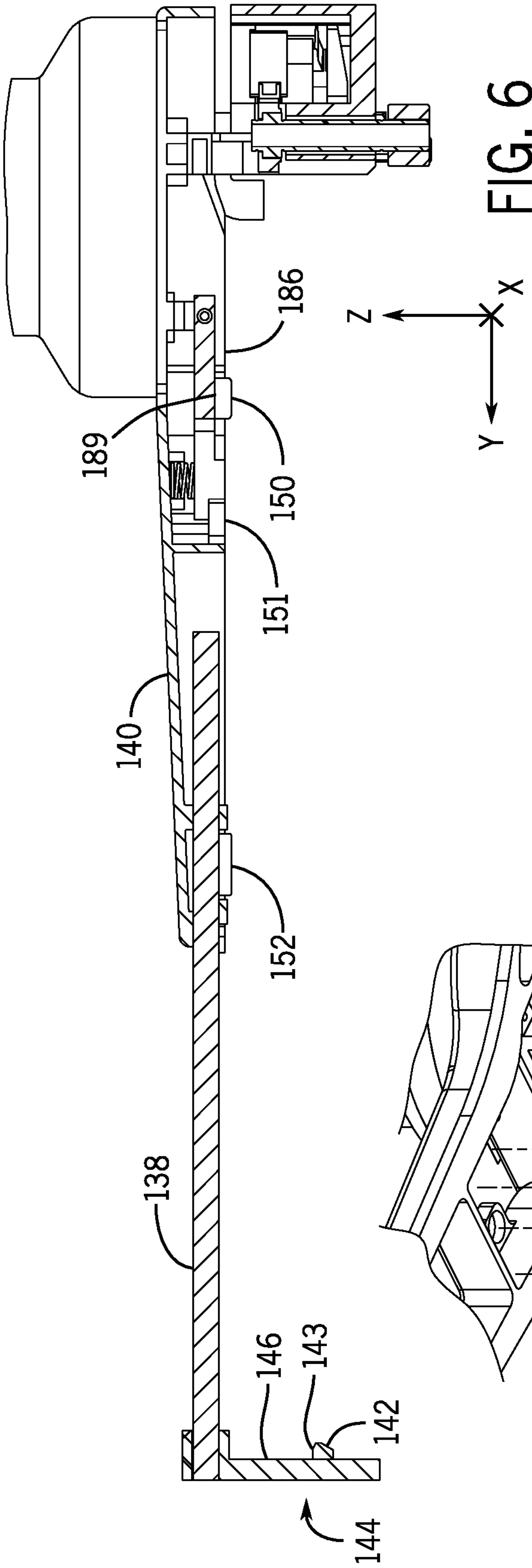
FIG. 6 is a cross sectional view of the support of FIG. 5.
Figure 7:
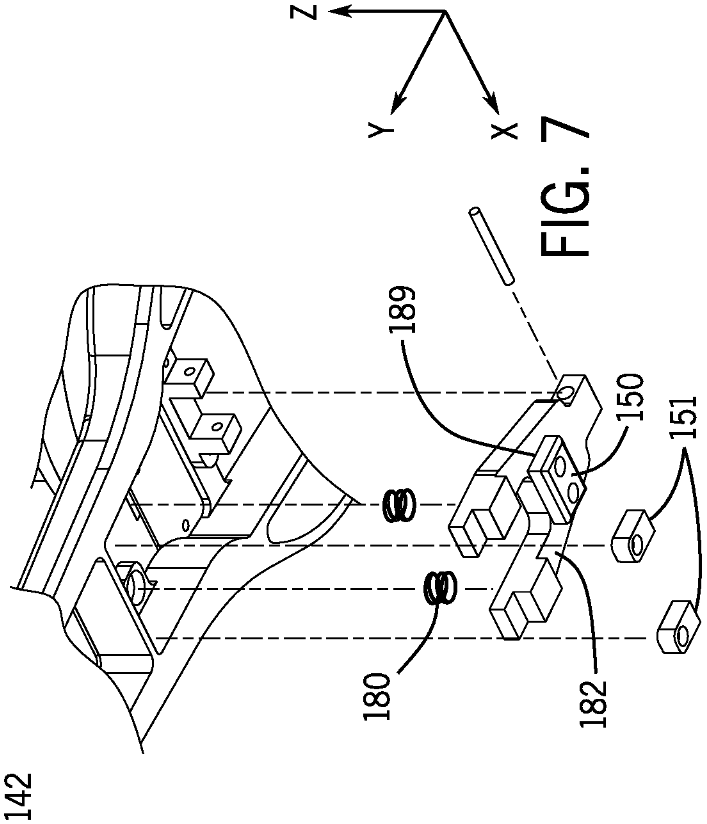
FIG. 7 is a partial exploded view of the spring biased pad of the support of FIG. 6.
Figure 8:
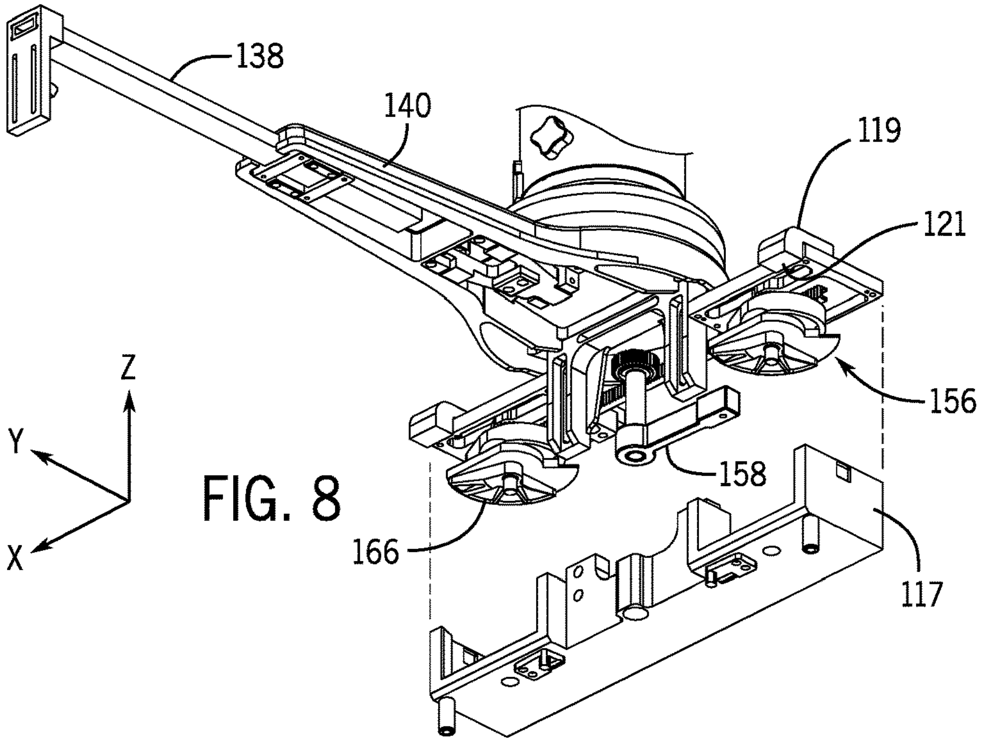
FIG. 8 is an exploded view of an engagement mechanism and base plate.
Figure 9:
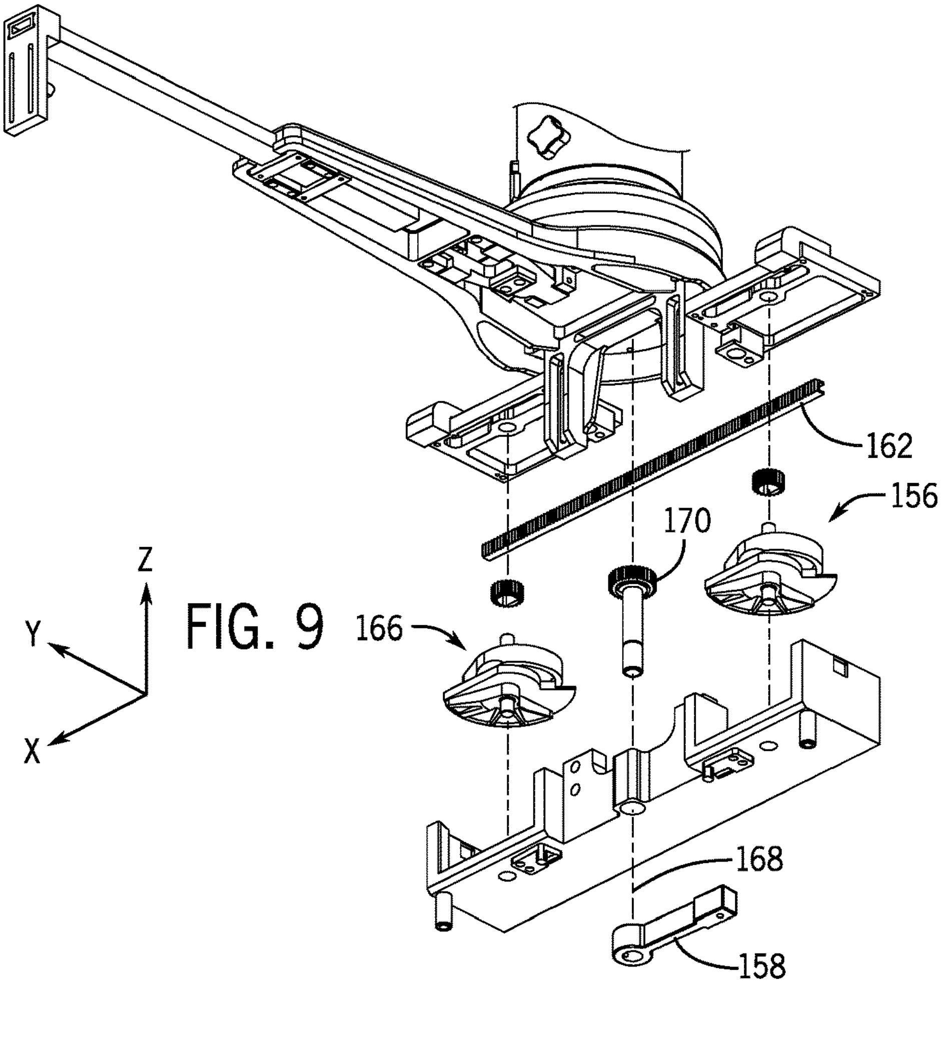
FIG. 9 is an exploded view of the engagement mechanism of FIG. 8.
Figure 10A:
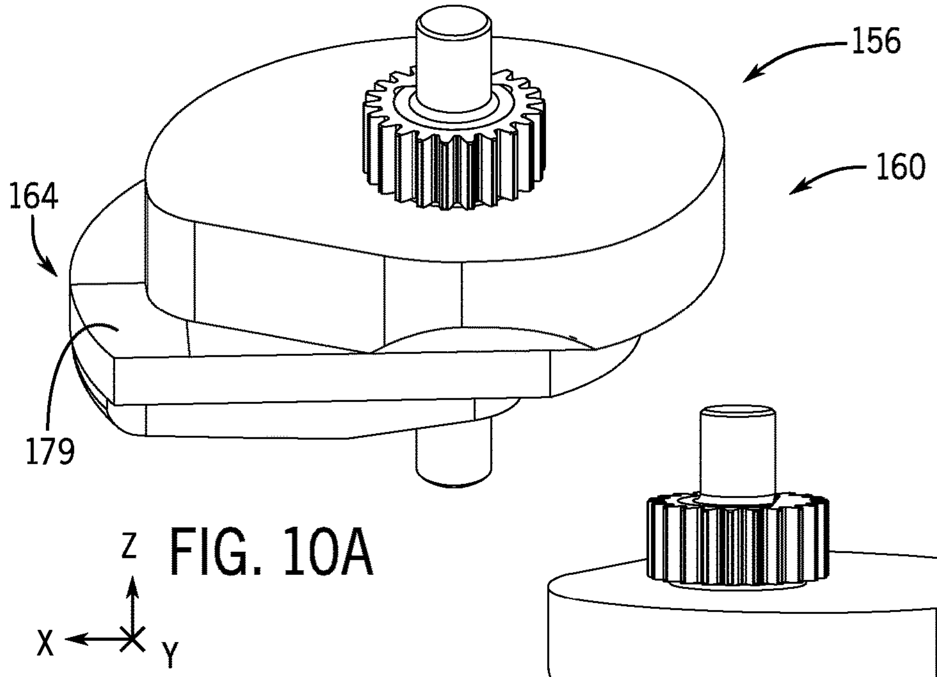
FIG. 10A is an isometric view of a cam assembly of the engagement mechanism of FIG. 8.
Figure 10B:
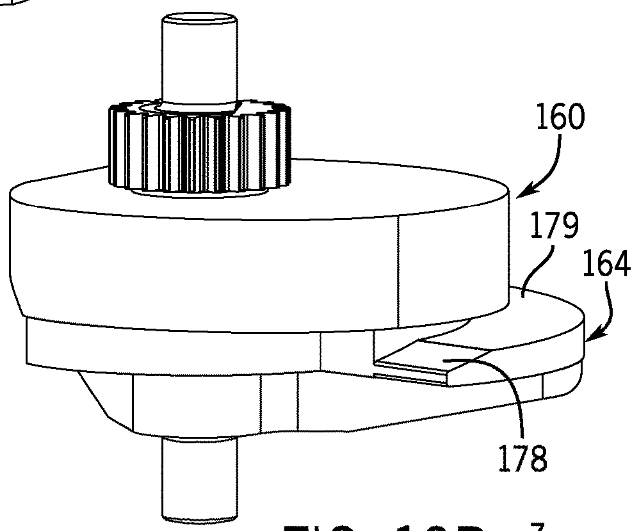
FIG. 10B is a second isometric view of the cam assembly of FIG. 10A.

Referring to FIG. 6 and FIG. 7 first pad 150 is biased with a biasing member 180 such that a pad force is applied to patient supporting surface 102 when support 100 is in the secured position. In one implementation first pad 150 is pivotally attached to base 108 with a pad arm 182. Biasing member 180 includes a compression spring and in one implementation includes two compression springs having a substantially constant spring force over the range of deflection when support 100 is secured to patient table 18. First pad 150 is positioned on pad arm 182 away from biasing member 180. The pad Force provides resistance to vertical, pitch, roll forces. In one implementation first pad 150 contacts patient supporting surface 102 proximate first rail 104. In the pre-load position in which support 100 is not in contact with patient supporting surface 102 biasing member 180 biases first pad 150 away from base 108 in a downward direction away from a bottom surface 186 of base 108 such that bottom surface 186 is intermediate a top surface 189 and the free surface of first pad 150. As support is moved from the loading position to a secured position a pad force is applied to patient supporting surface 102 from first pad 150. In one implantation there is sufficient travel in the biased pad suspension that when pad arm 182 is loaded the spring has not bottomed out. Pad arm 182 includes a hard stop that limits the travel of 150 toward patient supporting surface 102. This hard stop in the biased pad suspension allows for a lower spring constant such that one does not have to put a lot of energy into getting it to load each time support 100 is installed. In one implementation biasing member 180 applies 75% of the weight of the robotic drive 24 and support 100. So, where the weight of the robotic drive 24 and support 100 is 50 kg the biasing member applies a force countering 75% of the force applied by the 50 kg.

A second pad 152 is positioned on base 108 distal to first pad 150 and contacts patient supporting surface 102 closer to second rail 106 than first rail 104. Second pad 152 reacts to roll moments depending on the location of the center of mass of the support and robotic drive.

Figure 15:
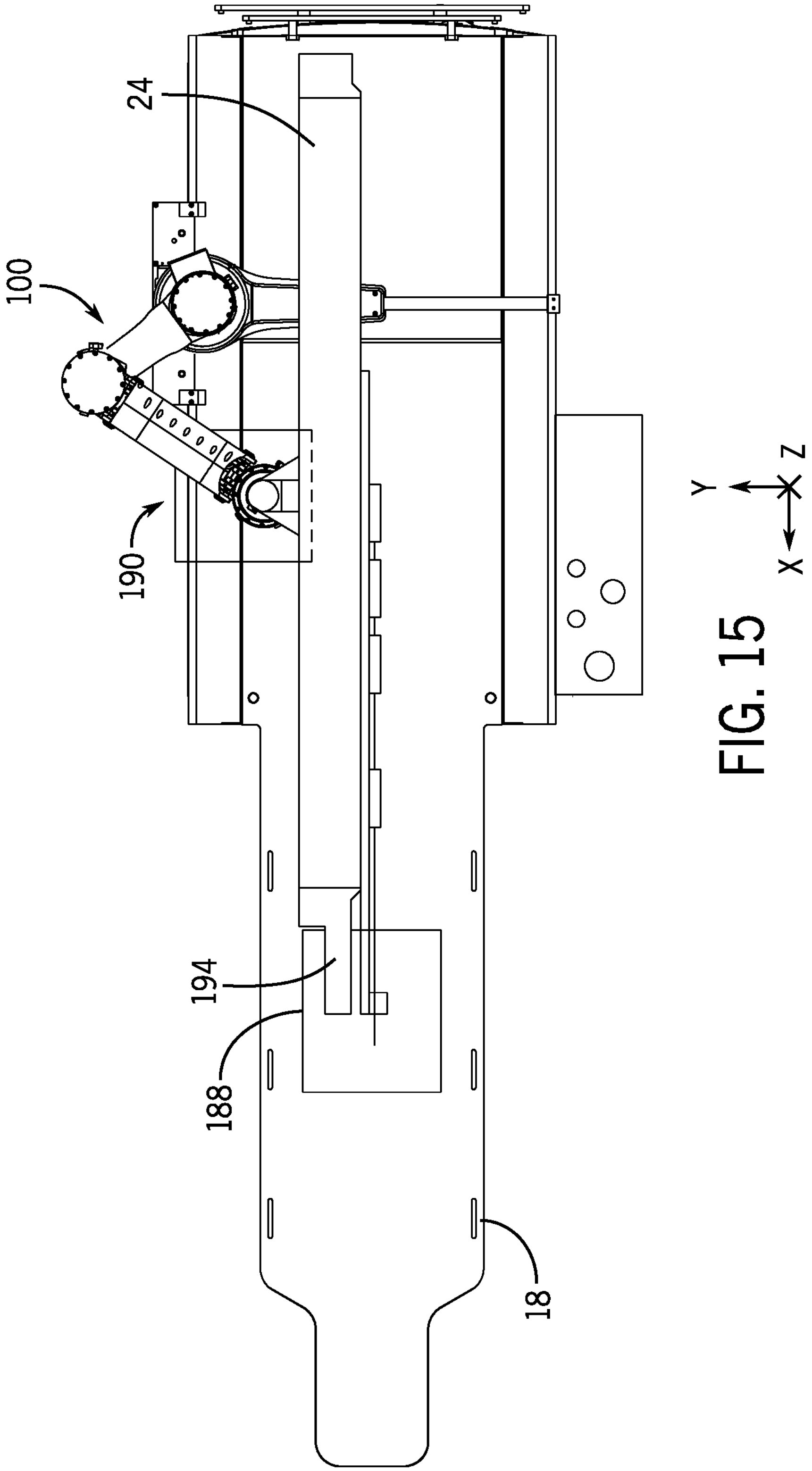
FIG. 15 is a top plan view of the robotic system secured to the patient table.

Referring to FIG. 15 in one implementation a distal end of robotic drive 24 can be moved within a zone 188 along the cross-table (Y-axis) and longitudinal table direction (X-axis) by movement of the positioning system 22. In one embodiment the movement of positioning system 22 is limited such that the distal end of robotic drive 24 remains within zone 188. In one implementation the movement of the distal end of robotic drive 24 is accomplished by limiting the movement of the articulated arm portion of the positioning system. The corresponding center of mass of the support 100 including the base and articulated arm is identified on FIG. 15 as center of mass zone 190. In one implementation the center of mass of the support 100 and robotic drive 24 may be laterally displaced from first rail 104 in a direction away from second rail 106. Stated another way the center of mass in one position when the distal end of robotic drive 24 is within zone 188 in the X-Y plane is off of patient table 18. The force applied by the mass of the support and robotic drive 24 applies a vertical force to patient supporting surface 102, first rail 104 and second rail 106.

Figure 17:
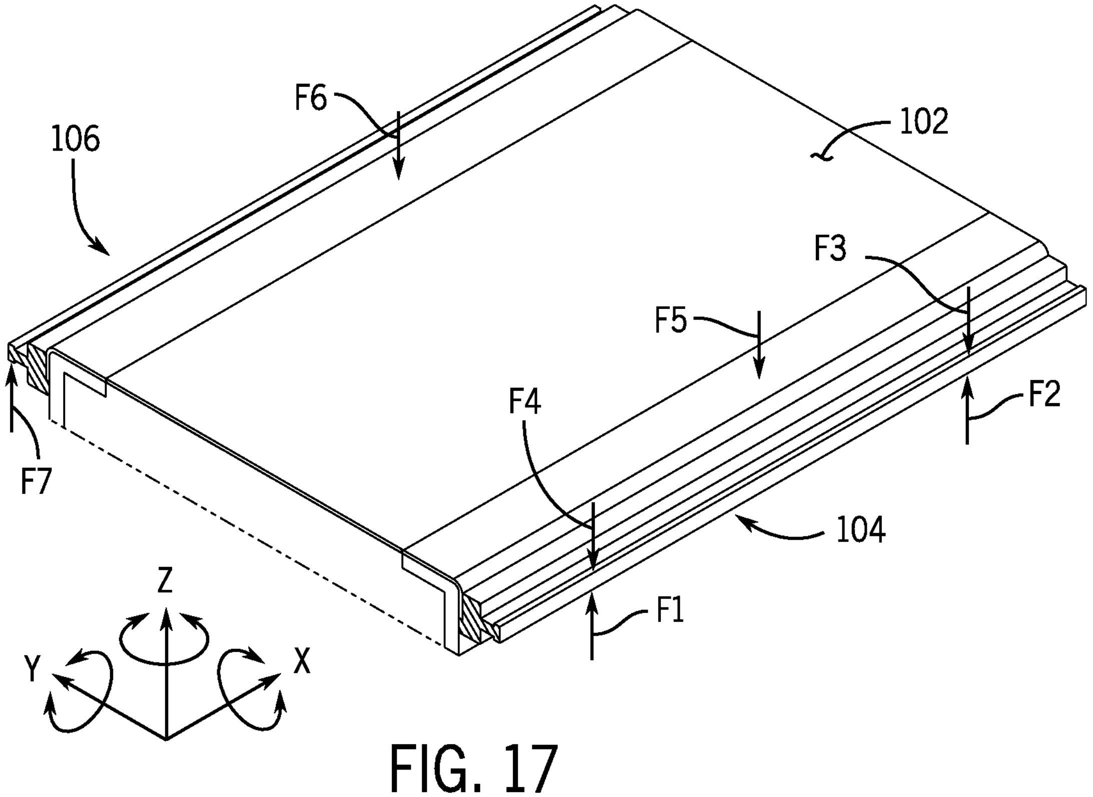
FIG. 17 is an isometric schematic representation of the forces on the patient table from the support and robotic mechanism.
Figure 18:
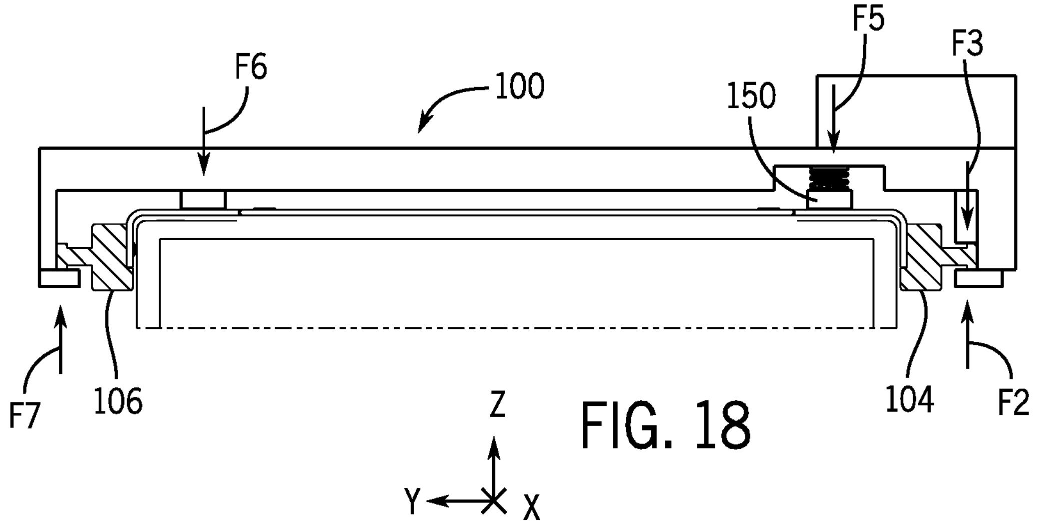
FIG. 18 is an end plan view of a schematic representation of the forces on the patient table from the support and robotic mechanism

The biasing force of biasing member 180 is selected such that the force of the support and robotic drive 24 combined with the pad force does not exceed a predetermined limit force on the first rail 104, second rail 106 and patient supporting surface 102. Stated another when the force applied to first rail 104 and second rail 106 would exceed a preterminal limit (orthogonal, pitch and/or roll) from the weight of robotic drive 24 and support 100 the pad force offsets the applied forces so that the predetermined force limit on the rails and patient support surface is not exceeded. Note that the force applied to first rail 104 by robotic drive 24 and support 100 depends on the orientation of the articulated arm. As noted herein the center of mass of the robotic drive 24 and support 100 has a limited locational range or mass zone 190 during a procedure. For all locations of the center of mass within mass zone 190 the pad force ensures that the predetermined force limit is not exceeded. Note that mass zone 190 may be larger than illustrated and may also cover the locations of support 100 during loading of support 100 to the patient table and during the application of draping to support 100. Referring to FIG. 17 and FIG. 18 a schematic sketch of a portion of patient table 18 shows the locations of forces F1-F7 acting on patient supporting surface 102, first rail 104 and second rail 106. Note that there are the locations that forces act on first rail 104 are spaced in the longitudinal X axis direction namely the locations that first cam assembly 156 and second cam assembly 166 contact first rail 104 as well as the two locations in which the ledge of each cam assembly contacts first rail 104. In one implementation each ledge is positioned along the longitudinal axis at generally the same location as the first cam assembly and second cam assembly. While the force applied to the second rail 106 is at the location in which tab 142 contacts second rail 106.

Depending on the location of the center of mass of the combined robotic drive and support, a force may be transmitted to first rail upper surface 126 via ledge 119. In one implementation ledge 119 is closely positioned adjacent but does not contact first rail upper surface 126. However, if the center of mass of the robotic drive and support is positioned such that ledge 119 will contact first rail upper surface 126 and transmit a force to first rail upper surface 126.

Figure 16:
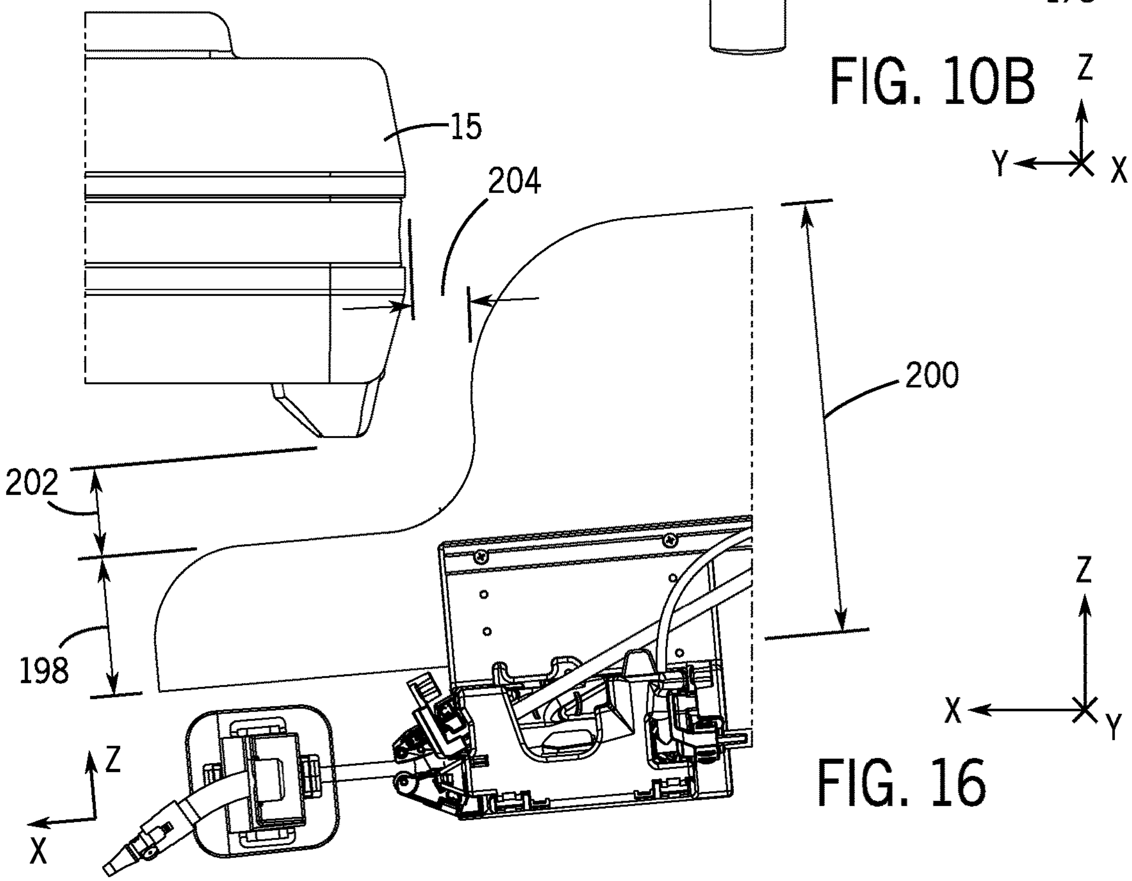
FIG. 16 is a close up view of the robotic system and portion of the C-arm.

Referring to FIG. 1 and FIG. 16 imaging system 14 includes an x-ray source 13 and a detector 15 both of which are supported on a C-arm. In one implementation support 100 is positioned on the table at indicia 192 such that the further position that distal end 194 of robotic drive 24 does not contact detector 15. In one implementation a sensor tracks the location of robotic drive relative to the imaging system and provides an alert to a user when a collision between robotic drive 24 and the imaging system is about to occur. Stated another way an alert in the form of audio signal or a display when the robotic drive 24 is within a predetermined distance of the imaging system. In one implementation the distal end 196 of robotic drive 24 has a tapered contour such that a height 198 of the tapered portion is less than the height 200 of the non-tapered portion of robotic drive 24. In one implementation movement of distal end 194 of robotic drive 24 within zone 188 will provide a clearance 202 in a vertical direction (Z axis) and a clearance 204 in the longitudinal table direction.

Referring to FIGS. 19-21C in one implementation a support 210 includes an engagement mechanism 212 that releasably moves a first paddle 214 and a second paddle 216 toward and away from outer surface 134 of first rail 104. Engagement mechanism 212 includes a first roller cam 218 and a second roller cam 220 that releasably contacts the lower surface 128 of first rail 104. While engagement mechanism 212 and engagement mechanism 116 both operate to provide cross-table and vertical motion to support 210 and support 100 respectively, as discussed herein engagement mechanism 212 includes a first roller cam 218 and a second roller cam 220 instead of the sliding cam surfaces 164. First roller cam 218 and second roller cam 220 rotate about their longitudinal axis as first roller cam 218 and second roller cam 220 engage first rail 104.

Engagement mechanism 212 includes a handle 224 that actuates first paddle 214 and first roller cam 218 by a first linkage 226. Handle 224 actuates second paddle 216 and second roller cam 220 by a second linkage 228. First linkage 226 includes a first linkage member 244 pivotally connected to first member 234. Second linkage 228 includes a linkage member 246 operatively connected to handle 224 and a second linkage 248. A third linkage 250 is pivotally connected to second linkage 248 and a second member similar to first member 234. Second linkage 228 includes two more linkage members than first linkage 226 in order to change the direction in second paddle 216 and second roller cam 220 engage first rail 104 as discussed herein.

Figure 20A:
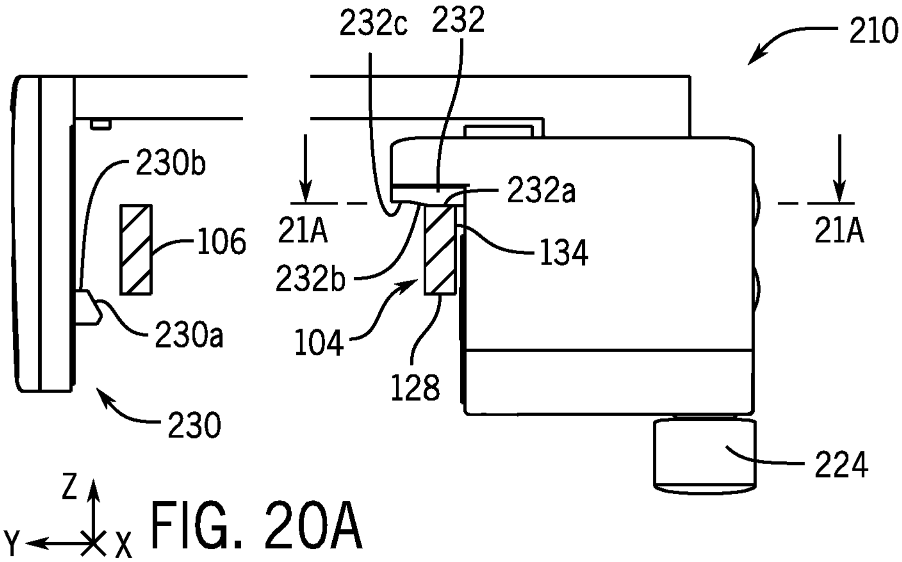
FIG. 20A is a view of a support after being first lowered onto the patient table.
Figure 20B:
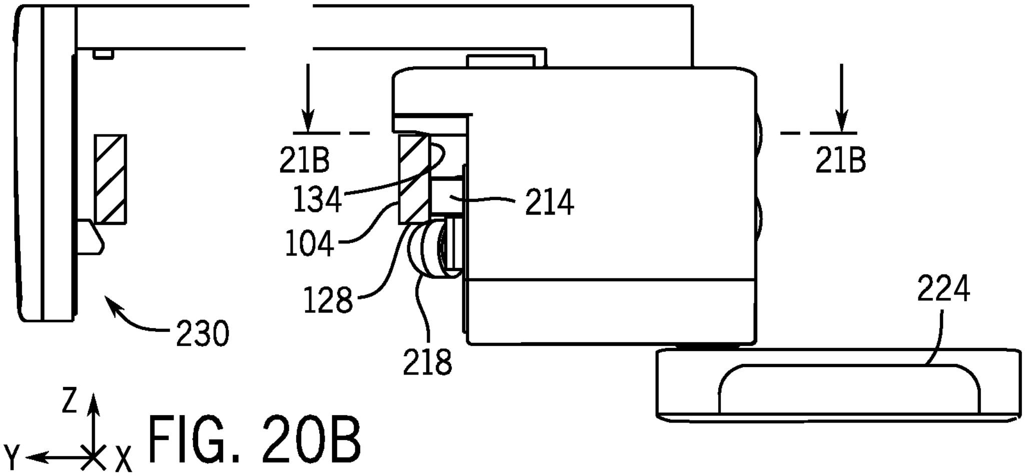
FIG. 20B is a view of the support being moved in a cross-table direction.
Figure 20C:
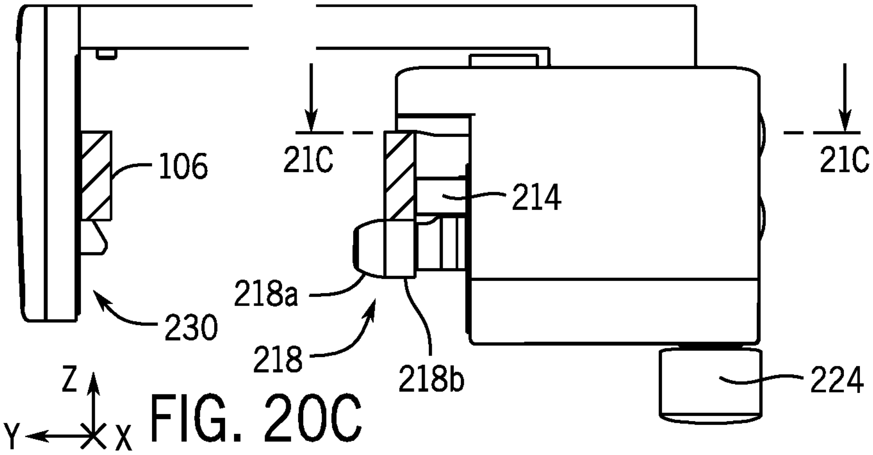
FIG. 20C is a side view of the support being moved in a vertical direction.
Figure 21C:
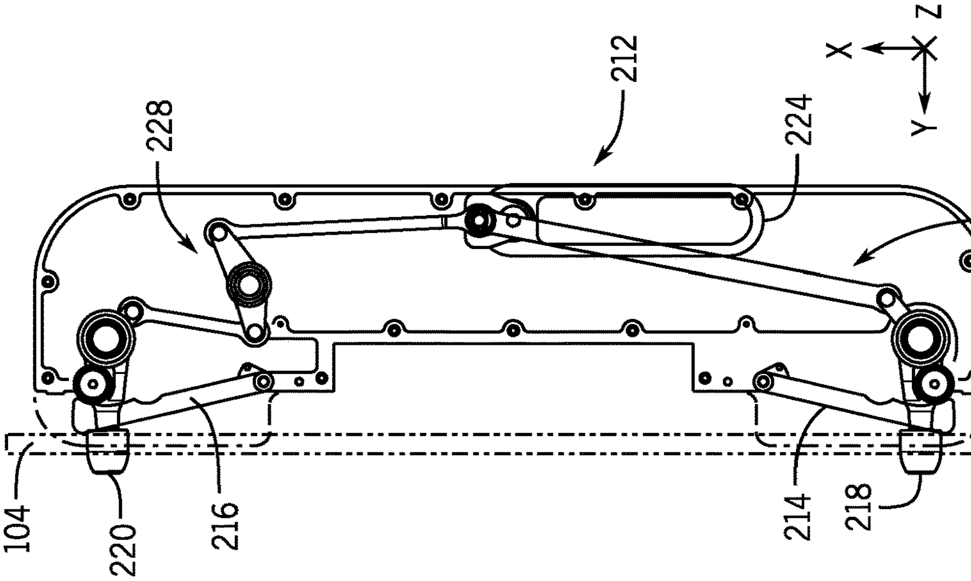
FIG. 21C is a cross-sectional view of the support taken generally along line 21C-21C of FIG. 20C.
Figure 21B:
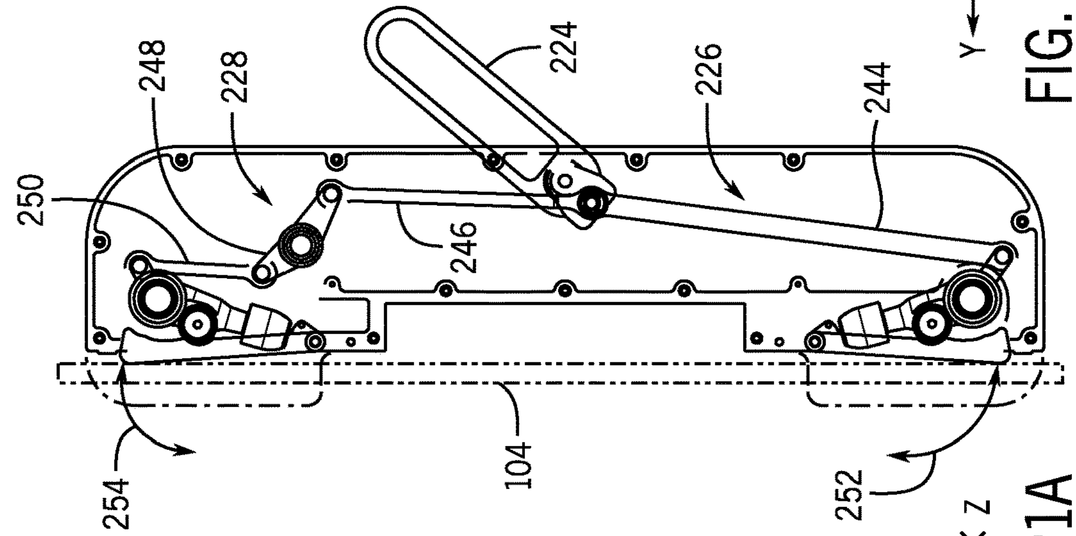
FIG. 21B is a cross-sectional view of the support taken generally along line 21B-21B of FIG. 20B.
Figure 21A:
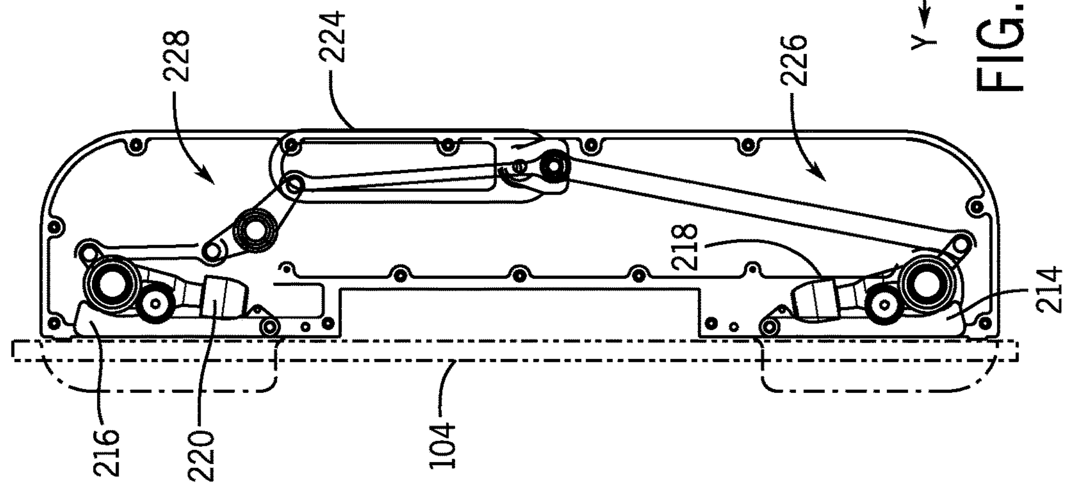
FIG. 21A is a cross-sectional view of the support taken generally along line 21A-21A of FIG. 20A.

Referring to FIG. 20A and FIG. 21A handle 224 is in a first disengaged position. In the first disengaged position, first paddle 214, first roller cam 218, second paddle 216, and second roller cam 220 are in a first position. As a user moves handle 224 clockwise about a pivot, first linkage 226 operatively moves first paddle 214 in a first direction 252 direction about a first paddle post into contact with outer surface 134 of first rail 104 at a first location. Simultaneously second linkage 228 operatively moves second paddle 216 in a second direction 254 opposite first direction 252 about a second paddle post into contact with outer surface 134 of first rail 104 at a second location spaced from the first location. In one implementation first direction 252 is clockwise and second direction 254 is counterclockwise. Stated another way first paddle 214 and second paddle 216 move in opposite directions along the longitudinal axis of first rail 104 as handle 224 is moved from the disengaged position to the engaged position. Similarly, first roller cam 218 and second roller cam 220 also move in opposite directions along the longitudinal axis of first rail 104 as handle 224 is moved from the disengaged position to the engaged position. This opposite movement minimizes the chance that support 210 will inadvertently move along the longitudinal ais of first rail 104 as handle 224 is moved from the disengaged to engaged positions.

Figure 19:
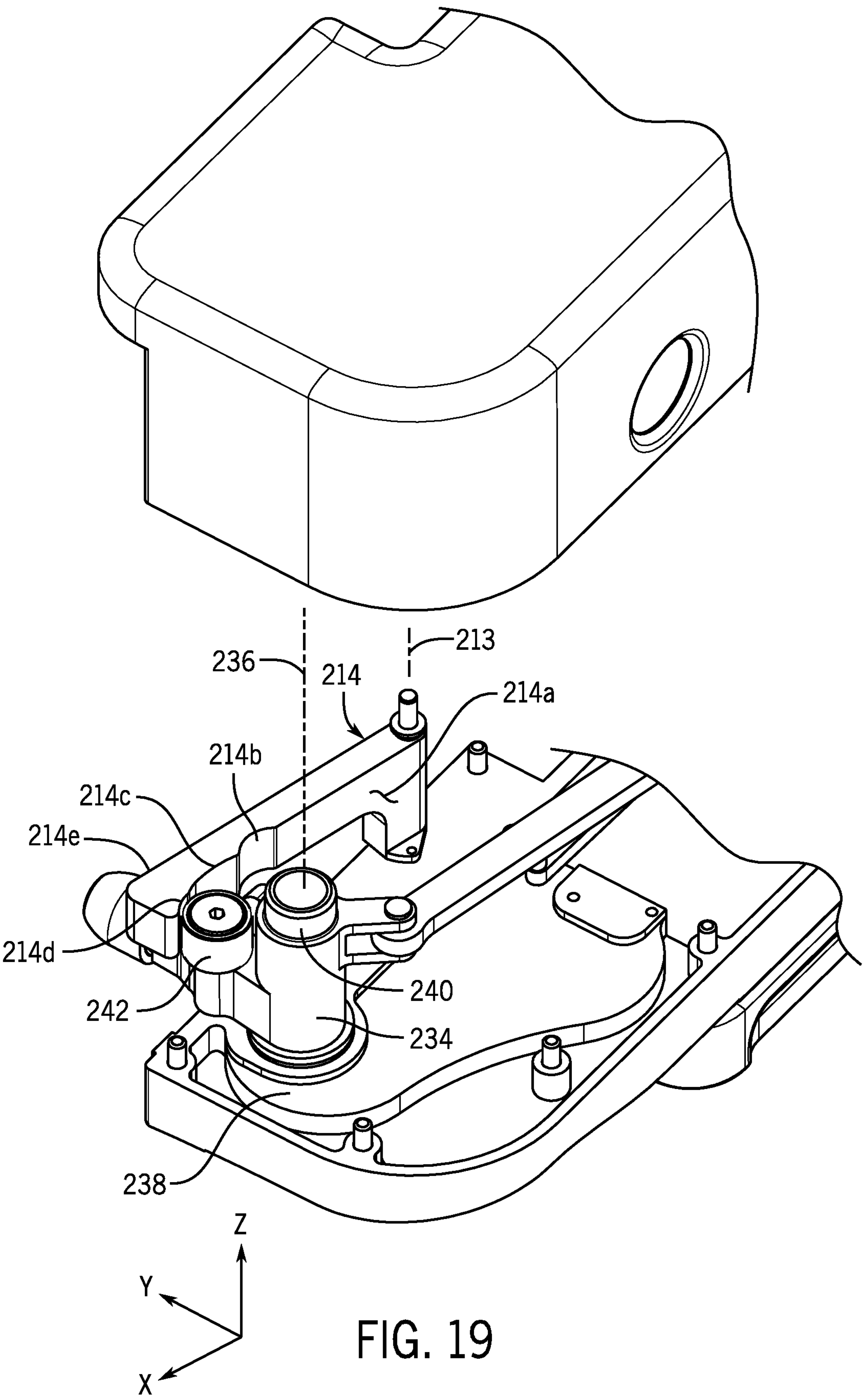
FIG. 19 is an isometric view of part of an engagement mechanism.

Referring to FIG. 19 first linkage 226 includes a first member 234 that pivots about a post or cam shaft 240 having a longitudinal axis 236. First member includes an extension fixed rotatingly supporting second roller cam 220. First member also includes a post having a longitudinal axis parallel to longitudinal axis 236 about which a first guide roller 242 rotates. First guide roller 242 engages outer surface 214*a* of first paddle 214. Outer surface 214*a* of first paddle 214 includes a number of regions with different profiles, A first profile 214*b*, a second profile 214*c* and a third profile 214*d*. Additionally there are transition regions between each of the profiles. In the disengaged position first guide roller 242 is engaged with first profile 214*b*. First paddle 214 is spring biased against first guide roller 242 by a biasing member such as a spring to bias paddle toward roller 242 about paddle post 213. As handle 224 is moved by a user from the disengaged position toward the engaged position first guide roller 242 moves from first profile 214*b* toward second profile 214*c* over the transition between first profile 214*b* and second profile 214*c* and thereby moves first paddle 214 toward first rail 104. As handle 224 is moved to the fully engaged position first guide roller 242 moves from second profile second profile 214*c* to third profile 214*d*. The second profile maintains the paddle in the same location despite the cam moving. This allows the vertical shift to happen with no change in horizontal movement. Third profile 214*d* is a dwell profile is configured such that the force between first paddle 214 and first guide roller 242 does not move first guide roller 242 back toward the paddle post. Stated another way in the third profile there is no net torque on the camshaft.

Referring to FIG. 20A, FIG. 20B, FIG. 20C, FIG. 21A, FIG. 21B and FIG. 21C as handle 224 is moved from the fully disengaged position to the fully engaged position first roller cam 218 is moved from a position in which roller cam 218 is not in contact with first rail lower surface 128 to a position in which first roller cam 218 is in contact with first rail lower surface 128. First roller cam 218 includes a first frustoconical portion 218*a* and a second conical portion 218*b* as handle 224 is moved from the fully disengaged position to the fully engaged position first frustoconical portion 218*a* of first roller cam 218 first contacts first rail lower surface 128. First roller cam 218 rotates about the first roller cam 218 longitudinal axis as first roller cam 218 contacts first rail lower surface 128. In the fully engaged position second conical portion 218*b* of first roller cam 218 is in contact with first rail lower surface 128 thereby securing support 210 to patient supporting surface 102.

Support 210 includes an engagement member 232 having a first substantially planar portion 232*a*, a second sloped surface 232*b* extending between first substantially planar portion 232*a* and a third planar portion 232*c*. When a user places support 210 over patient supporting surface 102 first substantially planar portion 232*a* rests on first rail upper surface 126 of first rail 104. As first paddle 214 is moved toward first rail 104 by actuation of handle 224 first rail upper surface 126 moves from first substantially planar portion 232*a* to second sloped surface 232*b* and ultimately third planar portion 232*c* when handle 224 is in the fully engaged position.

Similar to support 100, support 210 includes a cross-arm and a second engagement member to engage second rail 106. Second engagement member includes a tab 230 having an upper beveled surface 230*a* that guides opposing second rail lower surface 132 to an upper planar surface 230*b* of tab 230. In certain situations, in which the center of gravity of support 210 would cause an outer edge of opposing second rail lower surface 132 to otherwise hit tab 230 as support 210 is being loaded onto patient supporting surface 102.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described is manifestly intended to be as broad as possible. For example, unless specifically otherwise noted, the definitions reciting a single particular element also encompass a plurality of such particular elements.

What is claimed is:

1. A support for attaching a mechanism to a patient table having a patient supporting surface and a first rail and a second rail, the support comprising:

a base;

a first engagement member;

a second engagement member; and a single engagement mechanism configured to be actuated by movement of an actuating member in a single direction and move the base in a first direction parallel to a patient table plane defining the patient supporting surface, and in a second direction perpendicular to the patient supporting surface upon movement of the actuating member in the single direction.

2. The support of claim 1, wherein the single engagement mechanism is configured to attach the base to at least one of the first rail or the second rail in the first direction and the second direction upon movement of the actuating member in the single direction.

3. The support of claim 2, wherein the single engagement mechanism is configured to move the first engagement member and the second engagement member between a loading position and a secured position attaching the base to the at least one of the first rail or the second rail.

4. The support of claim 1, wherein the single engagement mechanism includes a cam assembly including a first cam surface configured to move the base in the first direction.

5. The support of claim 4, wherein the cam assembly further includes a second cam surface configured to move the base in the second direction.

6. The support of claim 1, wherein the single engagement mechanism includes a cam assembly including a first roller cam and a second roller cam, the first roller cam and the second roller cam being configured to engage the first rail.

7. The support of claim 1, wherein the single engagement mechanism is configured to secure the base in a cross-table direction parallel to the patient table plane and in a vertical direction perpendicular to the patient supporting surface.

8. The support of claim 1, further comprising:

an arm integrated with the base, the arm extending parallel to the patient table plane and configured to contact the patient supporting surface.

9. The support of claim 1, wherein the first engagement member is configured to contact a top of the first rail and the second engagement member is configured to contact a bottom of the second rail in a secured position, the secured position attaching the base to the at least one of the first rail or the second rail.

10. The support of claim 9, wherein the base includes a first pad extending from a bottom surface of the base and configured to contact the patient supporting surface.

11. The support of claim 10, wherein the first pad is biased by a biasing member applying a pad force to the patient supporting surface.

12. The support of claim 11, wherein the pad force is substantially constant.

13. A catheter-based procedure system comprising:

a robotic drive; and a support configured to mount the robotic drive to a patient table having a patient supporting surface, the support including, a base, a first engagement member, a second engagement member, and a single engagement mechanism configured to be actuated by movement of an actuating member in a single direction and move the base in a first direction parallel to a patient table plane defining the patient supporting surface and in a second direction perpendicular to the patient supporting surface upon movement of the actuating member in the single direction.

14. The catheter-based procedure system of claim 13, wherein the single engagement mechanism is configured to attach the base to at least one of a first side of the patient table or a second side of the patient table in the first direction and the second direction upon movement of the actuating member in the single direction.

15. The catheter-based procedure system of claim 14, wherein the single engagement mechanism is configured to move the first engagement member and the second engagement member between a loading position and a secured position attaching the base to the at least one of the first side or the second side.

16. The catheter-based procedure system of claim 13, wherein the single engagement mechanism includes a cam assembly including a first cam surface configured to move the base in the first direction.

17. The catheter-based procedure system of claim 16, wherein the cam assembly further includes a second cam surface configured to move the base in the second direction.

18. The catheter-based procedure system of claim 13, wherein the single engagement mechanism includes a cam assembly including a first roller cam and a second roller cam, the first roller cam and the second roller cam being configured to engage a first side of the patient table.

19. The catheter-based procedure system of claim 13, wherein the single engagement mechanism is configured to secure the base in a cross-table direction parallel to the patient table plane and in a vertical direction perpendicular to the patient supporting surface.

20. The catheter-based procedure system of claim 13, further comprising:

an arm integrated with the base, the arm extending parallel to the patient table plane and configured to contact the patient supporting surface.

* * * * *